US011975943B2

(12) United States Patent
Guo et al.

(10) Patent No.: US 11,975,943 B2
(45) Date of Patent: May 7, 2024

(54) COMPOSITE HANDRAILS WITH REDUCED DENSITY CARCASS

(71) Applicant: EHC Canada, Inc., Oshawa (CA)

(72) Inventors: Qingping Guo, Scarborough (CA); Andrew Oliver Kenny, Toronto (CA); Reginald Anthony Butwell, Young's Point (CA); James Ryan Sabadin, Newcastle (CA); Jason Wong, Ajax (CA); Hani E. Naguib, Toronto (CA); Wanqiao Wang, Toronto (CA); Linghong Li, Toronto (CA); Ali Owais Anwer, Toronto (CA); Muhammad Abdul Samad Anwer, Toronto (CA)

(73) Assignee: EHC CANADA, INC., Oshawa (CA)

( * ) Notice: Subject to any disclaimer, the term of this patent is extended or adjusted under 35 U.S.C. 154(b) by 839 days.

(21) Appl. No.: 17/050,562

(22) PCT Filed: May 7, 2018

(86) PCT No.: PCT/CA2018/050540
§ 371 (c)(1),
(2) Date: Oct. 26, 2020

(87) PCT Pub. No.: WO2019/213732
PCT Pub. Date: Nov. 14, 2019

(65) Prior Publication Data
US 2021/0238012 A1    Aug. 5, 2021

(51) Int. Cl.
*B66B 23/24*    (2006.01)
*B29C 44/20*    (2006.01)
(Continued)

(52) U.S. Cl.
CPC .............. *B66B 23/24* (2013.01); *B29C 44/20* (2013.01); *B29C 44/24* (2013.01); *B29C 44/50* (2013.01);
(Continued)

(58) Field of Classification Search
CPC ......... B66B 23/24; B29C 44/24; B29C 44/20; B29C 44/50; B32B 5/18; B32B 27/40; B32B 27/08
(Continued)

(56) References Cited

U.S. PATENT DOCUMENTS 6,086,806 A    7/2000  Weatherall et al.
9,713,884 B2    7/2017  Kamm et al.
(Continued)

FOREIGN PATENT DOCUMENTS

CN    105984788 A    10/2016
DE    102014118480 A1    6/2016
(Continued)

OTHER PUBLICATIONS

Extended European Search Report in respect of European Application No. 18918358.5 dated Oct. 19, 2021.
(Continued)

*Primary Examiner* — James R Bidwell
(74) *Attorney, Agent, or Firm* — Bereskin & Parr LLP/S.E.N.C.R.L., s.r.l.

(57) ABSTRACT

In a handrail including a carcass, a stretch inhibitor within the carcass, and a sliding layer bonded to the carcass, at least a portion of the carcass has a gas phase dispersed in a solid polymer matrix. The gas phase can reduce a density of the carcass by at least 5% or 10%, or about 15%, as compared to a density of the polymer matrix. The carcass can have a generally uniform distribution of gas bubbles in the polymer matrix, which can define a generally closed cell structure in
(Continued)

the polymer matrix. The gas phase can be formed of particles of a syntactic foam dispersed in the polymer matrix. The handrail can further include a cover. The carcass and the cover can be formed of thermoplastic materials, and the cover can represent between 10 and 30% of the overall TPU required for the handrail.

28 Claims, 19 Drawing Sheets

(51) Int. Cl.
  *B29C 44/24* (2006.01)
  *B29C 44/50* (2006.01)
  *B32B 5/18* (2006.01)
  *B32B 27/08* (2006.01)
  *B32B 27/40* (2006.01)
  *B29K 105/04* (2006.01)

(52) U.S. Cl.
  CPC ............... *B32B 5/18* (2013.01); *B32B 27/08* (2013.01); *B32B 27/40* (2013.01); *B29K 2105/046* (2013.01); *B29K 2105/048* (2013.01); *B32B 2266/0278* (2013.01); *B32B 2307/536* (2013.01); *B32B 2307/732* (2013.01)

(58) Field of Classification Search
  USPC ......................................................... 198/337
  See application file for complete search history.

(56) References Cited

U.S. PATENT DOCUMENTS

| | | | |
|---|---|---|---|
| 2011/0067972 A1* | 3/2011 | Matheisl | B66B 23/24 198/337 |
| 2018/0022005 A1 | 1/2018 | Kenny et al. | |

FOREIGN PATENT DOCUMENTS

| | | | |
|---|---|---|---|
| JP | 63-300090 A | 12/1988 | |
| JP | 2010538932 A | 12/2010 | |
| JP | 6013560 B1 | 10/2016 | |
| JP | 2017137165 A | 8/2017 | |
| SU | 2318154 C1 | 7/1990 | |
| WO | 2000/001607 A1 | 1/2000 | |
| WO | 2006/010181 A2 | 2/2006 | |
| WO | 2009/033270 A1 | 3/2009 | |
| WO | 2009/033272 A1 | 3/2009 | |
| WO | 2009/033273 A1 | 3/2009 | |
| WO | 2009/059416 A1 | 5/2009 | |
| WO | 2009/059426 A1 | 5/2009 | |
| WO | 2009/076768 A1 | 6/2009 | |
| WO | 2016/176778 | * 11/2016 | ............ B66B 23/24 |
| WO | 2016/176778 A1 | 11/2016 | |
| WO | 2016/201578 A1 | 12/2016 | |
| WO | 2019/104434 A1 | 6/2019 | |
| WO | 2019/104435 A1 | 6/2019 | |
| WO | 2019/213732 A1 | 11/2019 | |

OTHER PUBLICATIONS

International Search Report dated Jan. 17, 2019 in respect of PCT/CA2018/050540.
International Preliminary Report on Patentability dated Nov. 10, 2020 in respect of PCT/CA2018/050540.
Guo et al., "Thermoplastic Polyurethane Foaming Through Extrusion using a Blowing Agent", SPE Antec, Anaheim, 2017, pp. 1175-1179.
Examination report in respect of European Application No. 18918358.5 dated Apr. 6, 2023.
https://wpc-research.ru/blog/primienieniie_polimiernykh_mikrosfiel_expancell_v_ekstruzii_dpk.
https://cyberleninka.ru/article/n/polimernye-mikrosfery-v-emulsionnyh-vzryvchatyh-veschestvah.

* cited by examiner

COMPOSITE HANDRAILS WITH REDUCED DENSITY CARCASS

FIELD

The present disclosure relates generally to handrails suitable for use with an escalator, a moving walkway and/or other transportation apparatus.

BACKGROUND

The following paragraphs are not an admission that anything discussed in them is prior art or part of the knowledge of persons skilled in the art.

International Publication No. WO 2000/001607 A1 describes a moving handrail construction, for escalators, moving walkways and other transportation apparatus with a handrail having a generally C-shaped cross section and defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer is formed from a harder thermoplastic than the second layer, and this has been found to give improved properties to the lip and improved drive characteristics on linear drives.

International Publication No. WO 2009/033270 A1 describes a method and apparatus for extrusion of an article. A die assembly can apply flows of thermoplastic material to an array of reinforcing cables to form a composite extrusion. A slider fabric can be bonded to one side of the composite extrusion. After exiting the die assembly, the slider fabric can act to support the extrudate as it passes along an elongate mandrel, which can cause the base of the slider fabric to change shape from a flat profile to the final internal profile of the article. The extruded article can then be cooled to solidify the material. The die can include cooling for the slider fabric and means for promoting penetration of the thermoplastic into reinforcing cables.

International Publication No. WO 2009/033272 A1 describes modified handrails for use in escalators, moving walkways and other transportation apparatus. Handrail can include a configuration for a cable array as a stretch inhibitor that reduces cable buckling under severe flexing conditions. Handrail can also include a configuration for first and second thermoplastic layers in the lip portions that reduces strain and bending stresses and increases fatigue failure life under cyclic loading conditions. Handrail can also include, for the stretch inhibitor, the use of cables comprising large outer strands and small inner strands that enable penetration and adhesion within the first layer and can reduce incidence of fretting or corrosion.

International Publication No. WO 2009/033273 A1 describes a method and apparatus for pretreatment of slider layer for extruded handrails having a slider layer source, a means of conveying the slider layer to a heating module which subjects the slider layer to an elevated temperature for a residence time, and a means of conveying the slider layer to an extrusion die head. One or more control feeders may be implemented for maintaining portions of the slider layer in a substantially tension-free loop as the slider layer is conveyed from the slider layer source to the extrusion die head. A cooling zone may be included to ensure adequate cooling between the heating module and the extrusion die head. Means for reducing heat transfer between the extrusion die head and the slider layer is also provided.

International Publication No. WO 2016/176778 A1 describes a handrail that includes a carcass, a stretch inhibitor arranged within the carcass, a cover bonded to the carcass, and a sliding layer secured to the carcass. At a central width axis of the handrail, a face height between an upper exterior surface of the cover and a bottom surface of the sliding layer may be less than about 8.0 mm. The carcass may be formed of a first thermoplastic material, the cover may be formed of a second thermoplastic material, and the first thermoplastic material may be harder than the second thermoplastic material. The first thermoplastic material may have a modulus at 100% elongation of between 10 and 16 MPa, and may have a hardness of between 93 and 96 Shore A.

International Publication No. WO 2016/201578 A1 describes a method of and apparatus for extruding an article of uniform cross-section, the article including a thermoplastic material and at least one cable for inhibiting stretch of the article. The cable is supplied to a respective tube and is conveyed between upstream and downstream ends. The thermoplastic material may be supplied to the downstream end of the tube. The thermoplastic material is brought together with the cable to embed the cable within the thermoplastic material, thereby forming a composite extrudate. The tube is configured to at least hinder movement of loose windings of the cable from the downstream end towards the upstream end, which may prevent or at least reduce incidence of "birdcaging".

INTRODUCTION

The following paragraphs are intended to introduce the reader to the more detailed description that follows and not to define or limit the claimed subject matter.

According to an aspect of the present disclosure, a handrail can include: a carcass; a stretch inhibitor within the carcass; and a sliding layer bonded to the carcass. At least a portion of the carcass can include a gas phase dispersed in a solid polymer matrix.

The gas phase can reduce a density of the at least a portion of the carcass by at least 5% as compared to a density of the polymer matrix. The gas phase can reduce the density of the at least a portion of the carcass by at least 10% as compared to the density of the polymer matrix. The gas phase can reduce the density of the at least a portion of the carcass by about 15% as compared to the density of the polymer matrix.

The carcass can have a generally uniform distribution of gas bubbles in the polymer matrix. The gas bubbles can define a generally closed cell structure in the polymer matrix. The gas phase can be formed of particles of a syntactic foam dispersed in the polymer matrix. The particles can include Expancel™ expanded microspheres. The carcass can have approximately 1% (by weight) of the Expancel™ expanded microspheres.

The polymer matrix can be formed of a first thermoplastic material. The first thermoplastic material can consist of a polyester-based thermoplastic polyurethane. The first thermoplastic material can have a hardness of between about 92 and 98 Shore A, or about 95 Shore A.

The carcass can include a first side carcass portion, a second side carcass portion spaced apart from the first side carcass portion, and a central carcass portion of generally uniform thickness extending between the first and second side carcass portions. The central carcass portion can define an upper interior surface, and the first and second side carcass portions can define first and second concave interior surfaces, respectively, adjoining the upper interior surface on either side thereof. The stretch inhibitor can be within the central carcass portion. The sliding layer can be bonded at least to the upper interior surface and the first and second concave interior surfaces.

The handrail can include a cover bonded to the carcass. The cover can include a first side cover portion covering the first side carcass portion, a second side cover portion covering the second side carcass portion, and a central cover portion of generally uniform thickness extending between the first and second side cover portions adjacent to the central carcass portion. The central cover portion can define an upper exterior surface, and the first and second side cover portions can define first and second convex exterior surfaces, respectively, adjoining the upper exterior surface on either side thereof. The first and second side cover portions can further define first and second lower interior surfaces, respectively, adjoined between the first and second concave interior surfaces and generally opposed first and second side interior surfaces, respectively. The cover can be formed of a second thermoplastic material.

The carcass can taper in thickness around the first and second side carcass portions, and the cover can have a corresponding increase in thickness around the first and second side cover portions. The first and second side cover portions can further define the first and second side interior surfaces, respectively.

The cover can taper in thickness around the first and second side cover portions, and the carcass can have a corresponding increase in thickness around the first and second side carcass portions. The first and second side carcass portions can further define the first and second side interior surfaces, respectively. A cover lip height at the first and second side interior surfaces can be between about 0.1 and about 1.0 mm. Each of the first and second side cover portions can terminate at a position that is offset outwardly in relation to the first and second side interior surfaces, respectively. A cover height at a central width axis can be between about 0.5 and about 1.5 mm. A cover side width at a central height axis can be between about 0.5 and about 1.5 mm. The cover can be sized to require between about 10 and about 30% of the thermoplastic material of the handrail.

The second thermoplastic material can consist of a polyester-based thermoplastic polyurethane. The second thermoplastic material can have a hardness of between about 85 and 92 Shore A, or about 86 Shore A.

According to an aspect of the present disclosure, a handrail can include: a carcass; a cover bonded to the carcass; a stretch inhibitor within the carcass; and a sliding layer bonded to the carcass. At least a portion of the carcass can include a gas phase dispersed in a first thermoplastic material.

The carcass can include a first side carcass portion, a second side carcass portion spaced apart from the first side carcass portion, and a central carcass portion of generally uniform thickness extending between the first and second side carcass portions. The central carcass portion can define an upper interior surface, and the first and second side carcass portions can define first and second concave interior surfaces, respectively, adjoining the upper interior surface on either side thereof.

The cover can include a first side cover portion covering the first side carcass portion, a second side cover portion covering the second side carcass portion, and a central cover portion of generally uniform thickness extending between the first and second side cover portions adjacent to the central carcass portion. The central cover portion can define an upper exterior surface, and the first and second side cover portions can define first and second convex exterior surfaces, respectively, adjoining the upper exterior surface on either side thereof. The first and second side cover portions can further define first and second lower interior surfaces, respectively, adjoined between the first and second concave interior surfaces and generally opposed first and second side interior surfaces, respectively. The cover can be formed of a second thermoplastic material.

The stretch inhibitor can be within the central carcass portion. The sliding layer can be bonded at least to the upper interior surface and the first and second concave interior surfaces.

The carcass can taper in thickness around the first and second side carcass portions, and the cover can have a corresponding increase in thickness around the first and second side cover portions. The first and second side cover portions can further define the first and second side interior surfaces, respectively.

The cover can taper in thickness around the first and second side cover portions, and the carcass can have a corresponding increase in thickness around the first and second side carcass portions. The first and second side carcass portions can further define the first and second side interior surfaces, respectively. A cover lip height at the first and second side interior surfaces can be between about 0.1 and about 1.0 mm. Each of the first and second side cover portions can terminate at a position that is offset outwardly in relation to the first and second side interior surfaces, respectively. A cover height at a central width axis can between about 0.5 and about 1.5 mm. A cover side width at a central height axis can be between about 0.5 and about 1.5 mm. The cover can be sized to require between about 10 and about 30% of the thermoplastic material of the handrail.

The second thermoplastic material can consist of a polyester-based thermoplastic polyurethane. The second thermoplastic material can have a hardness of between about 85 and 92 Shore A, or about 86 Shore A.

The gas phase can reduce a density of the at least a portion of the carcass by at least 5% as compared to a density of the first thermoplastic material. The gas phase can reduce the density of the at least a portion of the carcass by at least 10% as compared to the density of the first thermoplastic material. The gas phase can reduce the density of the at least a portion of the carcass by about 15% as compared to the density of the first thermoplastic material.

The carcass can have a generally uniform distribution of gas bubbles in the first thermoplastic material. The gas bubbles can define a generally closed cell structure in the first thermoplastic material. The gas phase can be formed by particles of a syntactic foam dispersed in the first thermoplastic material. The particles can include Expancel™ expanded microspheres. The carcass can have approximately 1% (by weight) of the Expancel™ expanded microspheres.

The first thermoplastic material can consist of a polyester-based thermoplastic polyurethane. The first thermoplastic material can have a hardness of between about 92 and 98 Shore A, or about 95 Shore A.

A method of manufacturing the handrail can include: supplying the stretch inhibitor and the sliding layer to a die assembly; supplying the first thermoplastic material to the die assembly in a molten state; dispersing the gas phase in the first thermoplastic material to form the carcass; bringing the first thermoplastic material together with the stretch inhibitor, thereby to embed the stretch inhibitor within the first thermoplastic material; bringing the sliding layer up against the first thermoplastic material, the first thermoplastic material, the stretch inhibitor and the sliding layer thereby forming a composite extrudate; and extruding the composite extrudate from the die assembly.

The step of dispersing can include introducing a chemical or physical blowing agent to the first thermoplastic material. The step of introducing can include adding particles to the polymer matrix to form a syntactic foam. The particles can include Expancel™ unexpanded microspheres.

A method of manufacturing the handrail can include: supplying the stretch inhibitor and the sliding layer to a die assembly; supplying the first thermoplastic material to the die assembly in a molten state; dispersing the gas phase in the first thermoplastic material to form the carcass; bringing the first thermoplastic material together with the stretch inhibitor, thereby to embed the stretch inhibitor within the first thermoplastic material; bringing the sliding layer up against the first thermoplastic material; supplying the second thermoplastic material to the die assembly in a molten state as a separate flow, and bringing the flow of second thermoplastic material up against the first thermoplastic material on an opposing side relative to the sliding layer to form the cover, the first and second thermoplastic materials, the stretch inhibitor and the sliding layer thereby forming a composite extrudate; and extruding the composite extrudate from the die assembly.

The step of dispersing can include introducing a chemical or physical blowing agent to the first thermoplastic material. The step of introducing can include adding particles to the polymer matrix to form a syntactic foam. The particles can include Expancel™ unexpanded microspheres.

According to an aspect of the present disclosure, a method of extruding an article of constant cross section can include: supplying a first thermoplastic material in a molten state; dispersing a gas phase in a polymer matrix of the first thermoplastic material to form a heterogeneous mixture; and extruding the mixture from a die assembly.

The step of dispersing can include introducing a chemical or physical blowing agent to the first thermoplastic material. The step of introducing can include adding particles to the polymer matrix to form a syntactic foam. The particles can include Expancel™ unexpanded microspheres.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
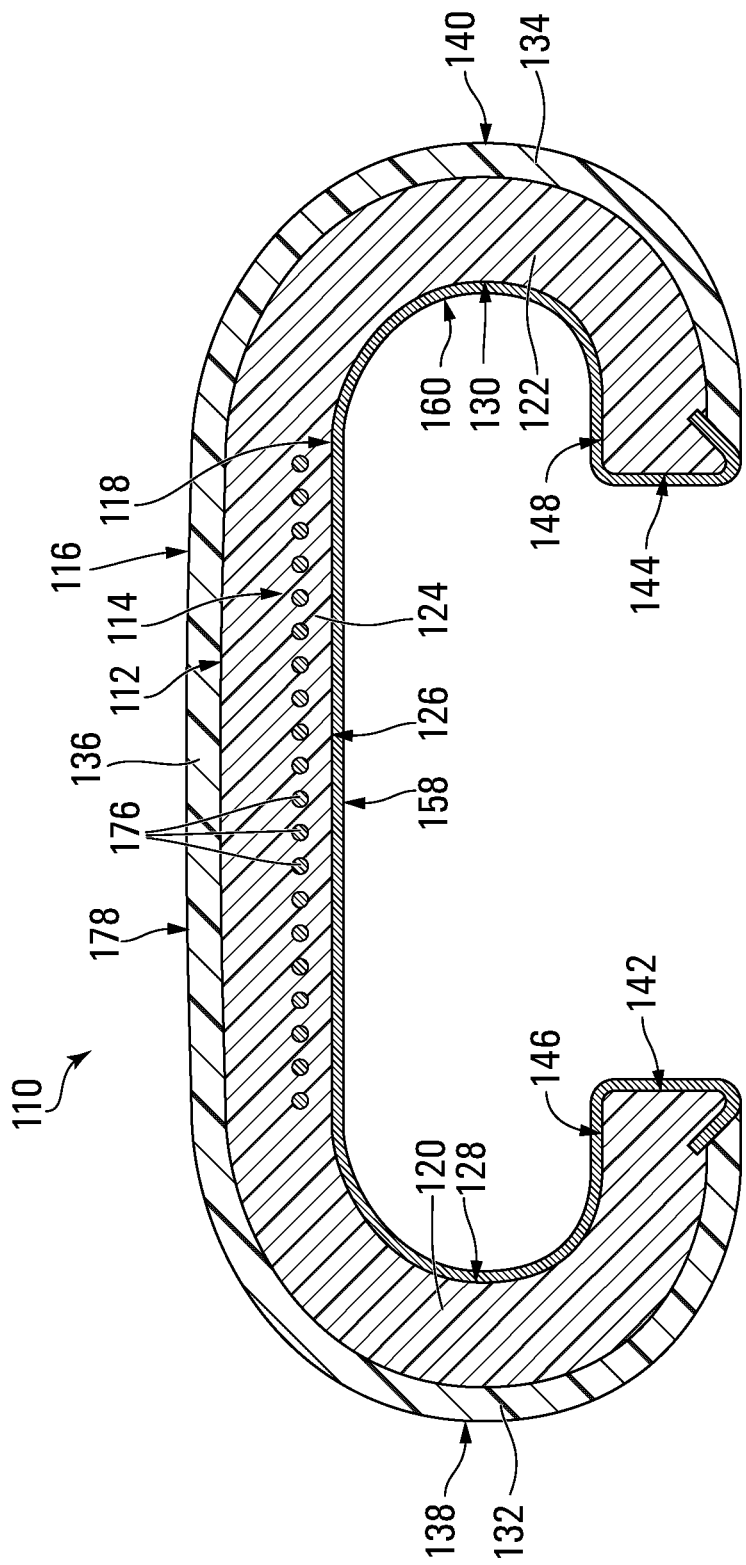
FIGS. 1 and 2 are sectional views of a first example of a handrail.

Referring to FIG. 1, a handrail is shown generally at reference numeral 110. The handrail 110 includes a carcass 112, a stretch inhibitor 114, a cover 116, and a sliding layer 118. The handrail 110 can be described as having a generally C-shaped cross section, which defines an internal generally T-shaped slot.

Some current handrails employ a solid, polyester-based thermoplastic polyurethane carcass 112 below the cover 116, which is also formed of a polyester-based thermoplastic polyurethane, for encasing and supporting the stretch inhibitor 114 from thermo-mechanical damage.

Thermoplastic polyurethane (TPU) is a thermoplastic elastomer consisting of a linear segmented block copolymer composed of hard and soft segments. Introduced by Bayer in 1937, TPU was synthesized via a polyaddition reaction of diisocyanates with diols. The polymer's final resin structure is composed of linear polymeric chains of amorphous, flexible soft segments and crystalline, rigid hard segments. The soft blocks enhance the elasticity and flexibility of the polymer. The hard blocks provide the strength and rigidity of the TPU. There are generally no chemical cross-links in the thermoplastic elastomer. The physical cross-links in TPU make it thermally reversible.

TPU can be mainly categorized into three groups based on the composition of the soft segments: polyester based TPUs, polyether-based TPUs, and polycaprolactone TPUs. Polyester-based TPU may provide good abrasion resistance and mechanical properties. Polyether-based TPU may provide low-temperature flexibility and hydrolysis resistance. Polycaprolactone TPUs may have similar toughness and resistance as polyester-based TPUs, but may also feature good low-temperature performance and a relatively high resistance to hydrolysis.

In some examples, the handrail 110 may be manufactured using extrusion methods and apparatuses in accordance with the teachings of International Publication Nos. WO 2009/033270 A1, WO 2009/033272 A1, WO 2009/033273 A1 and/or WO 2016/201578 A1, and the entire contents of each are herein incorporated by reference. During extrusion, two TPUs (for the carcass 112 and the cover 116), steel cords (for the stretch inhibitor 114), and fabric (for the sliding layer 118) may be supplied and extruded through a single die to form the handrail 110. In general, final performance properties of handrails are a combination of each of these component's properties. The carcass 112 and the cover 116 portions may be formed of different TPU materials with different mechanical properties due to their different roles in the handrail structure.

In some examples, the carcass 112 may include a first thermoplastic material, and the cover 116 may be formed of a second thermoplastic material. The first thermoplastic material of the carcass 112 may be generally stiffer and harder than the second thermoplastic material of the cover 116, and serves to retain a mouth width of the handrail 110 to provide a desired lip stiffness. The carcass 112 also serves to protect the stretch inhibitor 114, which in this case is formed of the cables 176, and the bond between the cables 176 and the first thermoplastic material of the carcass 112 may be improved by adhesive (not shown). Although the stretch inhibitor is illustrated to be a plurality of cables, it will be appreciated that the stretch inhibitor can take other forms. For example, a metallic tape or tape including metallic cables embedded in a polymer could be used. In other examples, at least one composite member can be implemented as the stretch inhibitor, which may be formed as a "tape" with a plurality of continuous fibers in a polymeric binder, as disclosed in U.S. Publication No. 2018/0022005 A1, the entire contents of which are herein incorporated by reference The present disclosure is directed to handrails in which the carcass 112 is formed of a reduced density material. The physical properties, chemical resistance, abrasion resistance, good adhesion and ease of processing make TPU a good selection for this application. However, because the cost of TPU tends to be higher than other thermoplastic polymers, there is the potential for increasing the efficiency of material placement on current handrails by reducing the density of the carcass 112.

In some examples, the carcass 112 may be formed to be less dense by means of foaming. Foaming is a process whereby a gas phase is introduced into a polymer matrix resulting in cells/bubbles within the material. One of the advantages of foams over solid materials is an improved performance-to-cost ratio. Furthermore, the presence of gas-filled cells not only reduces the mass of material, but it may also provide more cushioning/mechanical damping, which may be desirable depending on the application.

It should be appreciated that, as used herein, the term "gas" is intended to include a vapor substance that is in the gas phase and, in use, is at a temperature that is lower than its critical temperature.

In some examples, it is beneficial to ensure that the cells are uniformly distributed in the matrix structure. This results in weight savings while reducing localized concentration of load and potential for failure. However, foaming is a thermodynamically complex phenomenon and may involve a multi-parametric optimization process for a given material system.

A polymeric foam is a two-phase material where gas is dispersed in a solid polymer matrix. Due to the quick combination of two phases, bubbles or voids are formed and incorporate themselves in the solid matrix. Based on cell morphology, polymeric foams may be categorized as either open cell or closed cell. Open cell foams tend to be more flexible, with cells partially connected by broken cell walls. Closed cell foams tend to be more rigid, with cells separated by complete, well-connected cell walls. The uniformity of polymer-gas mixture depends on the spatial distribution profile of the system's pressure, temperature and gas diffusion in the polymer matrix. Therefore, the system pressure must be greater than the solubility pressure to avoid formation of undissolved gas pockets and to speed up the process. Syntactic foam is a type of polymeric foam and is composed of two components: expandable particles that function as a filler; and a resin system, that functions as a binder. With the addition of filler content in the foam matrix, the system's moduli will be lowered and fracture properties may improve as the filler creates a torturous path for crack propagation.

In some examples, the carcass 112 may be formed of a TPU material that is foamed by introducing a foaming/blowing agent into the TPU polymer melt during extrusion, in which there is a heterogeneous mixture of polymer melt and distributed gas bubbles. A uniform dispersion of the blowing agent and an understanding of the rheological behavior of these mixtures may be important for developing and optimizing the processing conditions of a handrail production line.

Expancel™ microspheres have been applied as additives in thermoplastic, coating, paper, and textile industries. The unexpanded microspheres are thermoplastic shells enclosing a droplet of volatile saturated hydrocarbon that vaporizes upon heating. The sphere shells are made of copolymers with different glass transition temperatures. Upon reaching these temperatures, gas pressure from the vaporized hydrocarbons within the spheres cause shell expansion. The microspheres are fabricated through suspension polymerization, which splits the monomer into tiny droplets by mechanical agitation in a liquid phase. The droplets would then be stabilized by surfactants such as silica particles and $Mg(OH)_2$, preventing agglomeration and coalescence of droplets. The size of the expanded Expancel™ may range from 20-150 μm and the density may be reduced from 1000 to 30 $kg/m^3$ upon expansion, which may mostly takes place between 80 to 190° C. When heating up Expancel™, the hydrocarbon evaporates and the gas pressure will soften the thermoplastic shell, leading to expansion of the sphere. The shell will harden, stabilizing and retaining the shape upon cooling. Expancel™ is commercially available in two forms, expanded and unexpanded. The expanded Expancel™ serves as a filler in plastics and elastomers, while the unexpanded is applied as blowing agent in foaming by extrusion and injection molding.

The inventors have investigated making TPU foam using Expancel™ microspheres as a blowing agent in handrail production. Based on experimental results, Expancel™ may be useful as a chemical blowing agent to reduce the density of the carcass 112 in the handrail 110, as shown in FIG. 1. A suitable Expancel™ content was determined and various properties of the foamed handrail were tested. As described in further detail below, results suggested that various handrail extrusion processing parameters may not need to be changed for manufacturing the handrails including Expancel™ microspheres. The use of a foamed carcass resulted in a reduction of approximately 14 wt % in use of the TPU carcass material, and the foamed handrails passed various mechanical tests.

The structure of handrails will now be described in further detail.

Referring again to FIG. 1, in the example illustrated, the carcass 112 includes a first side carcass portion 120, a second side carcass portion 122 spaced apart from the first side carcass portion 120, and a central carcass portion 124 of generally uniform thickness extending between the first and second side carcass portions 120, 122. The stretch inhibitor 114 is shown arranged within the central carcass portion 124. In the example illustrated, the stretch inhibitor 114 is shown formed of a plurality of longitudinal cables 176 disposed along a central plane within the central carcass portion 124. The central carcass portion 124 delineates an upper interior surface 126. The first and second side carcass portions 120, 122 delineate first and second concave interior surfaces 128, 130, respectively. The first and second concave interior surfaces 128, 130 adjoin the upper interior surface 126 on either side thereof.

In the example illustrated, the cover 116 is bonded directly to the carcass 112 at an interface to form a continuous body. The cover 116 includes a first side cover portion 132 covering the first side carcass portion 120, a second side cover portion 134 covering the second side carcass portion 122, and a central cover portion 136 of generally uniform thickness extending between the first and second side cover portions 132, 134, adjacent to the central carcass portion 124. The central cover portion 136 delineates an upper exterior surface 178. The upper exterior surface 178 may exhibit a minor convex curve, as illustrated.

In the example illustrated, the first and second side cover portions 132, 134 delineate first and second convex exterior surfaces 138, 140, respectively. The first and second convex exterior surfaces 138, 140 adjoin the upper exterior surface 178 on either side thereof.

In the example illustrated, with the C-shaped cross section, the first and second side carcass portions 120, 122 extend around the T-shaped slot and define semi-circular lip portions, which delineate generally opposed first and second side interior surfaces 142, 144, respectively. The first and second side carcass portions 120, 122 and the first and second side cover portions 132, 134 may each have generally uniform thickness towards the first and second side interior surfaces 142, 144.

In the example illustrated, the first and second side carcass portions 120, 122 yet further delineate first and second lower interior surfaces 146, 148. The first lower interior surface 146 is shown adjoined between the first concave interior surface 128 and the first side interior surface 142, and the second lower interior surface 148 is shown adjoined between the second concave interior surface 130 and the second side interior surface 144, respectively.

In the example illustrated, the sliding layer 118 is bonded or otherwise secured to the upper interior surface 126, the first and second concave interior surfaces 128, 130, the first and second lower interior surfaces 146, 148, and the first and second side interior surfaces 142, 144. The sliding layer 118 may include curved ends that are embedded within the cover 116 adjacent to the first and second side interior surfaces 142, 144, as illustrated.

Handrails may be manufactured to have varying dimensions, including those in accordance with the teachings of International Publication Nos. WO 2000/001607 A1, WO 2009/033272 A1 and/or WO 2016/176778 A1, and the entire contents of each are herein incorporated by reference. The handrail 110 shown in FIGS. 1 and 2 correspond generally with the teachings of International Publication No. WO 2000/001607 A1.

Figure 2:
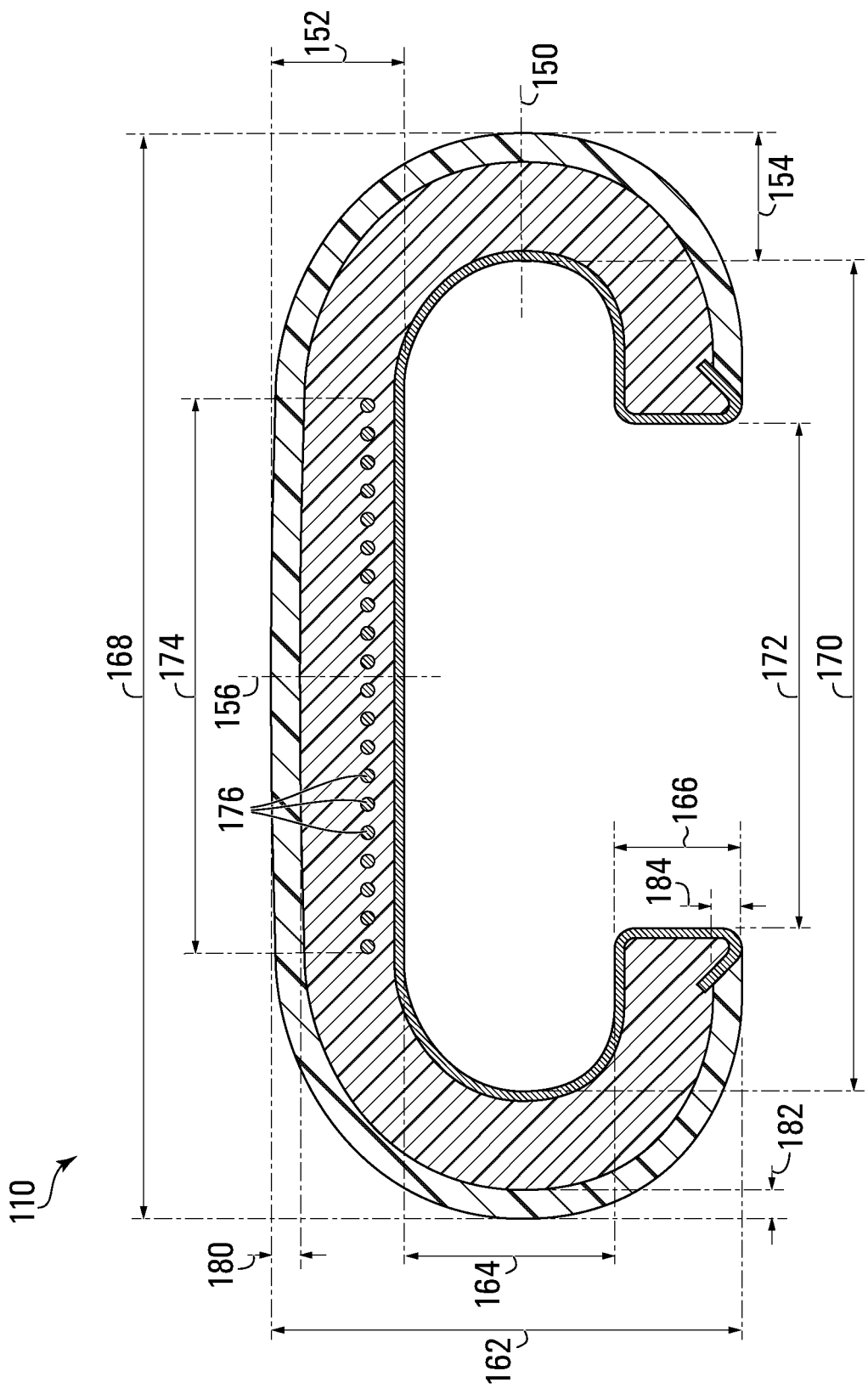

Various dimensions of the handrail 110 are illustrated in FIG. 2. It will be appreciated that some of the dimensions mentioned herein refer to just the TPU components of the handrail, the carcass and the cover, while others may refer to the overall structure including the slider layer and/or the stretch inhibitor, which should be clear with reference to the drawings, particularly FIGS. 2, 4, 6, 8, 10 and 12.

In the example illustrated, the handrail 110 has a face height 152 and a side width 154. The face height 152 is a vertical dimension at a central width axis 156 of the handrail 110 between the bottom surface 158 of the sliding layer 118 and the upper exterior surface 178 (the surfaces 158, 178 are shown in FIG. 1). The side width 154 is a horizontal dimension at a central height axis 150 of the handrail 110 between an inner side surface 160 of the sliding layer 118 and the second convex exterior surface 140 (the surfaces 160, 140 are shown in FIG. 1). The handrail 110 may be generally symmetrical about the central width axis 156, as illustrated, and therefore the side width may be the same on either side of the handrail 110.

Vertical dimensions of the handrail 110 further include a handrail height 162, a slot height 164, a lip height 166, a cover height 180 and a cover lip height 184. Horizontal dimensions of the handrail 10 further include a handrail width 168, a slot width 170, a mouth width 172, a stretch inhibitor width 174, and a cover side width 182.

Dimensions for the handrail 110 are provided in Table 1. These dimensions are intended to be illustrative but non-limiting.

TABLE 1

| Dimension | Reference | mm |
| --- | --- | --- |
| face height | 152 | 10.00 |
| slot height | 164 | 16.00 |
| handrail width | 168 | 82.00 |
| slot width | 170 | 63.00 |
| mouth width | 172 | 38.00 |
| cover height | 180 | 2.00 |

In accordance with this example, the cross sectional surface areas of the cover 116 and the carcass 112 can be approximately 306 mm$^2$ (26%) and 872 mm$^2$ (74%), respectively.

The foaming agent can be applied to handrail designs in a number of ways to reduce the density and cost and improve fabrication. In some examples, the foaming agent can be added to the interior portion of any existing TPU handrail, i.e. the carcass 112. In practice, the inventors have found that significant improvements can be achieved when applying the foaming agent to larger handrails, such as the example shown in FIGS. 1 and 2, which can be supplied as replacements to existing escalators. The relatively large cross section of these products means that more of the TPU material can be foamed.

In the example shown in FIGS. 1 and 2, the carcass 112 can be foamed by adding, e.g., 1 wt % of Expancel™ 950 MB 80. In some examples, the density of the carcass can be reduced by about 15%, which reduces the total TPU required by about 11%.

However, because of the change to the TPU material used for the carcass, the handrail design may require modification in order to maintain satisfactory product performance. Specifically, applying the foaming agent generally reduces the modulus of the TPU material. Handrails achieve their required axial stiffness and dimensional stability in bending from the rigidity of the cross section, and the carcass primarily. In some existing handrails, the carcass can be formed of 92 Shore A, Lubrizol Estane 58226™, or similar. Adding the foaming agent to this material at a desired amount can reduce the stiffness modulus to a level in which the product could distort excessively in bending and could be prone to derailing from the escalator unit. An alternate TPU carcass material was therefore selected, which had a similar stiffness to Estane 58226™ after the addition of 1 wt % foaming agent. The material is Covestro Texin 1215™, which has a hardness of 95 Shore A and similar tensile properties to Estane 58226™ after the addition of the foaming agent. Results are shown in Table 2 and FIG. 17.

TABLE 2

| Sample | Stress @ 50% (MPa) | Stress @ 100% (MPa) |
| --- | --- | --- |
| 95 Shore A TPU (Texin 1215 ™) | 6.85 | 8.66 |
| 95 Shore A + 1% Foaming Agent | 5.29 | 6.69 |
| Reduction in Tensile Stress | 23% | 23% |

A second handrail type where the foaming agent can be applied is in current high-volume products supplied to transit and commercial applications, as taught in International Publication No. WO 2009/033272 A1. Examples are illustrated in FIGS. 3, 4, 5 and 6. In these examples, there is less overall material where the foaming agent can be applied, but the effect can still be significant. The inventors have found that implementing foamed TPU into the carcass in these examples, the TPU requirement can be reduced by more than 7% of the total for the handrail.

Figure 3:
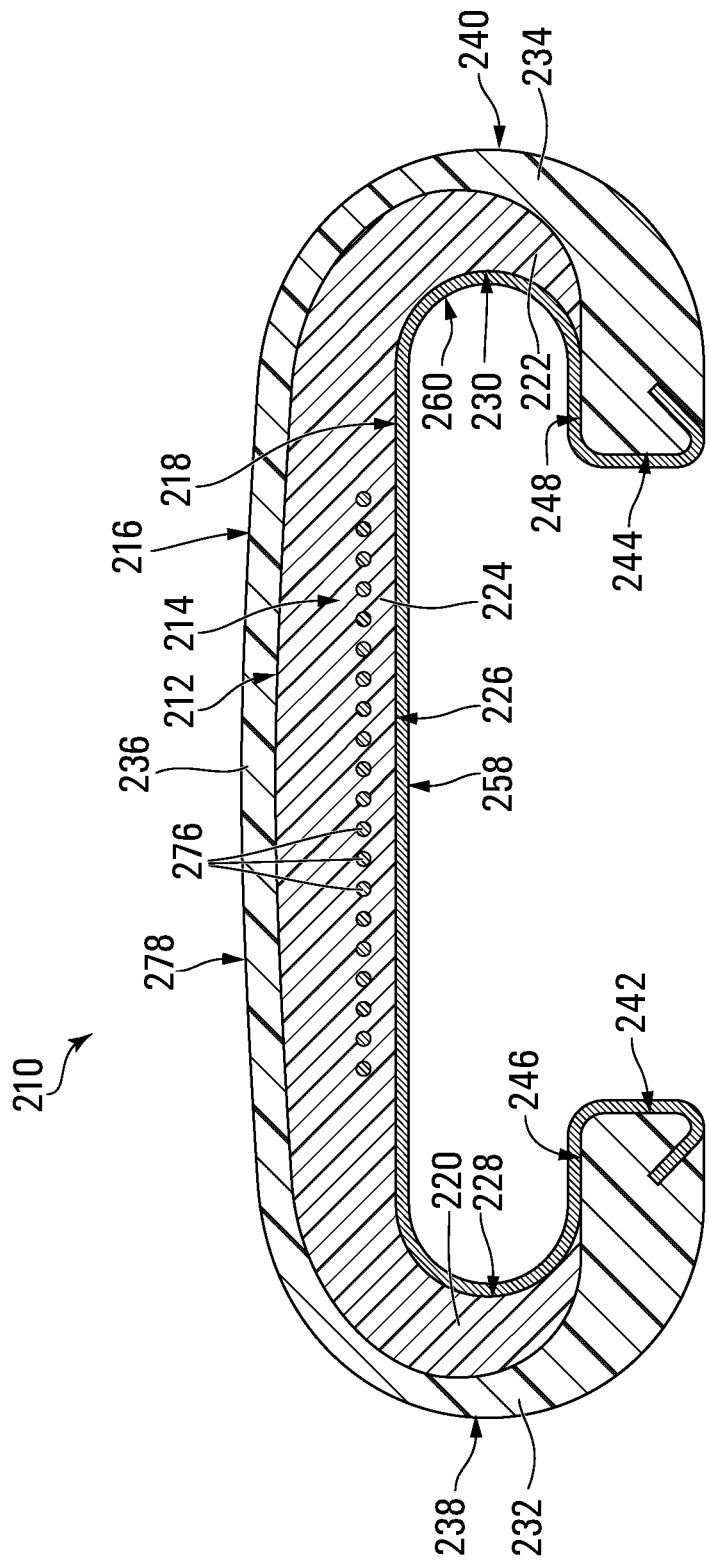
FIGS. 3 and 4 are sectional views of a second example of a handrail.

Referring to FIG. 3, a handrail is shown generally at reference numeral 210. The handrail 210 includes a carcass 212, a stretch inhibitor 214, a cover 216, and a sliding layer 218.

In the example illustrated, the carcass 212 includes a first side carcass portion 220, a second side carcass portion 222 spaced apart from the first side carcass portion 220, and a central carcass portion 224 of generally uniform thickness extending between the first and second side carcass portions 220, 222. The stretch inhibitor 214 is shown arranged within the central carcass portion 224. In the example illustrated, the stretch inhibitor 214 is shown formed of a plurality of longitudinal cables 276 disposed along a central plane within the central carcass portion 224. In this example, the carcass 212 is shown tapering in thickness around the first and second side carcass portions 220, 222. The central carcass portion 224 delineates an upper interior surface 226. The first and second side carcass portions 220, 222 delineate first and second concave interior surfaces 228, 230, respectively. The first and second concave interior surfaces 228, 230 adjoin the upper interior surface 226 on either side thereof.

In the example illustrated, the cover 216 is bonded directly to the carcass 212 at an interface to form a continuous body. The cover 216 includes a first side cover portion 232 covering the first side carcass portion 220, a second side cover portion 234 covering the second side carcass portion 222, and a central cover portion 236 of generally uniform thickness extending between the first and second side cover portions 232, 234, adjacent to the central carcass portion 224. The central cover portion 236 delineates an upper exterior surface 278. The upper exterior surface 278 may exhibit a minor convex curve, as illustrated.

In the example illustrated, the first and second side cover portions 232, 234 delineate first and second convex exterior surfaces 238, 240, respectively. The first and second convex exterior surfaces 238, 240 adjoin the upper exterior surface 278 on either side thereof.

In the example illustrated, with the C-shaped cross section, the first and second side cover portions 232, 234 extend around the T-shaped slot and define semi-circular lip portions, which delineate generally opposed first and second side interior surfaces 242, 244, respectively. The first and second side cover portions 232, 234 may each have increasing thickness towards the first and second side interior surfaces 242, 244, respectively, which compensates for the tapering of the carcass 212.

In the example illustrated, the first and second side cover portions 232, 234 yet further delineate first and second lower interior surfaces 246, 248. The first lower interior surface 246 is shown adjoined between the first concave interior surface 228 and the first side interior surface 242, and the second lower interior surface 248 is shown adjoined between the second concave interior surface 230 and the second side interior surface 244, respectively.

In the example illustrated, the sliding layer 218 is bonded or otherwise secured to the upper interior surface 226, the first and second concave interior surfaces 228, 230, the first and second lower interior surfaces 246, 248, and the first and second side interior surfaces 242, 244. The sliding layer 218 may include curved ends that are embedded within the cover 216 adjacent to the first and second side interior surfaces 242, 244, as illustrated.

Figure 4:
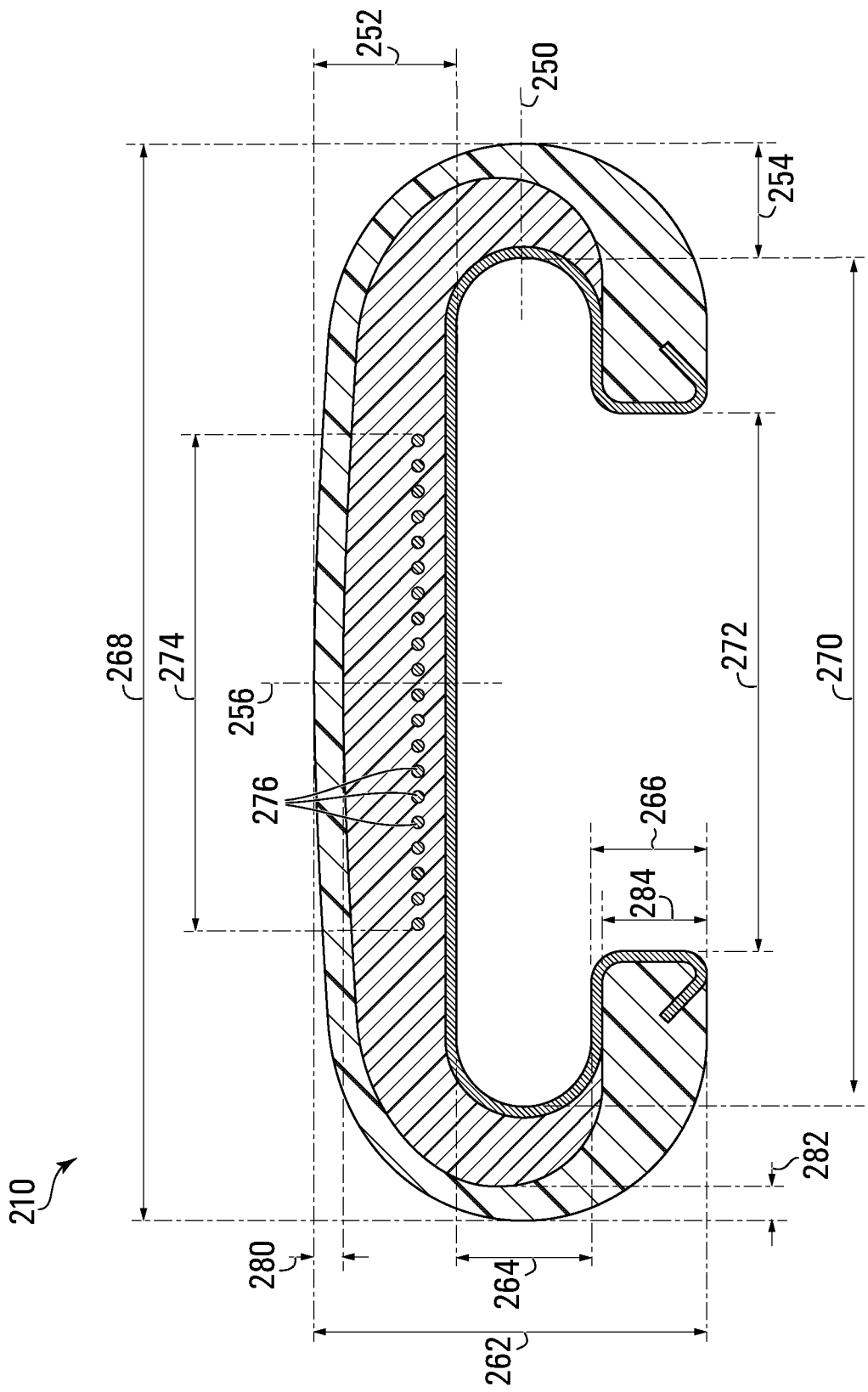

Various dimensions of the handrail 210 are illustrated in FIG. 4. In the example illustrated, the handrail 210 has a face height 252 and a side width 254. The face height 252 is a vertical dimension at a central width axis 256 of the handrail 210 between a bottom surface 258 of the sliding layer 218 and the upper exterior surface 278 (the surfaces 258, 278 are shown in FIG. 3). The side width 254 is a horizontal dimension at a central height axis 250 of the handrail 210 between an inner side surface 260 of the sliding layer 218 and the second convex exterior surface 240 (the surfaces 260, 240 are shown in FIG. 1). The handrail 210 may be generally symmetrical about the central width axis 256, as illustrated, and therefore the side width may be the same on either side of the handrail 210.

Vertical dimensions of the handrail 210 further include a handrail height 262, a slot height 264, a lip height 266, a cover height 280, and a cover lip height 284. Horizontal dimensions of the handrail 210 further include a handrail width 268, a slot width 270, a mouth width 272, a stretch inhibitor width 274, a cover side width 282.

Referring to FIGS. 3 and 4, the stretch inhibitor 214 is shown formed of a plurality of longitudinal cables 276 disposed along a central plane within the central carcass portion 224. In the example illustrated, end ones of the cables 276 are offset inwardly in relation to the first and second side interior surfaces 242, 244. In other words, the stretch inhibitor width 274 is substantially less than the mouth width 272. In operation, having the ones of the cables 276 spaced away from regions of stress in the portions 220, 222, 232, 234 may affect the ability of the stretch inhibitor 214 to retain a neutral plane during flexing.

Dimensions for the handrail 210 are provided in Table 3. These dimensions are intended to be illustrative but non-limiting.

TABLE 3

| Dimension | Reference | mm |
| --- | --- | --- |
| face height | 252 | 10.00 |
| slot height | 264 | 9.50 |
| handrail width | 268 | 76.00 |
| slot width | 270 | 60.00 |
| mouth width | 272 | 38.00 |
| cover height | 280 | 2.00 |

In accordance with this example, the cross sectional surface areas of the cover 216 and the carcass 212 can be approximately 430 mm² (48%) and 460 mm² (52%), respectively.

Figure 5:
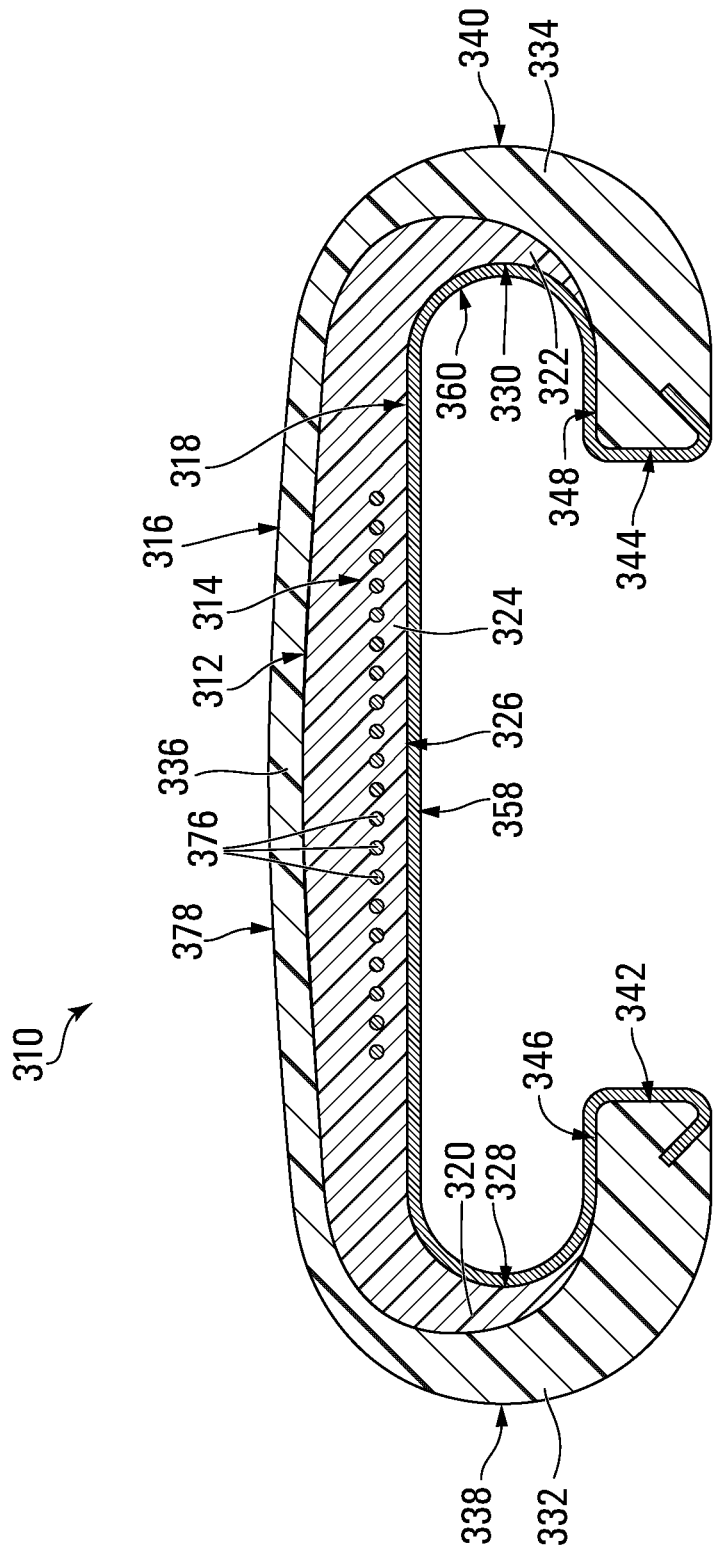
FIGS. 5 and 6 are sectional views of a third example of a handrail.

Referring to FIG. 5, a similar handrail is shown generally at reference numeral 310. The handrail 310 includes a carcass 312, a stretch inhibitor 314, a cover 316, and a sliding layer 318. The carcass 312 is shown tapering in thickness around first and second side carcass portions 320, 322. Compared to the handrail 210, the first and second side carcass portions 320, 322 taper more sharply, and first and second side cover portions 332, 334 each have a corresponding increase in thickness towards first and second side interior surfaces 342, 344. Otherwise, the structure of the handrail 310 is similar to that of the handrail 210 shown in FIGS. 3 and 4, and the description of features will not be repeated.

Figure 6:
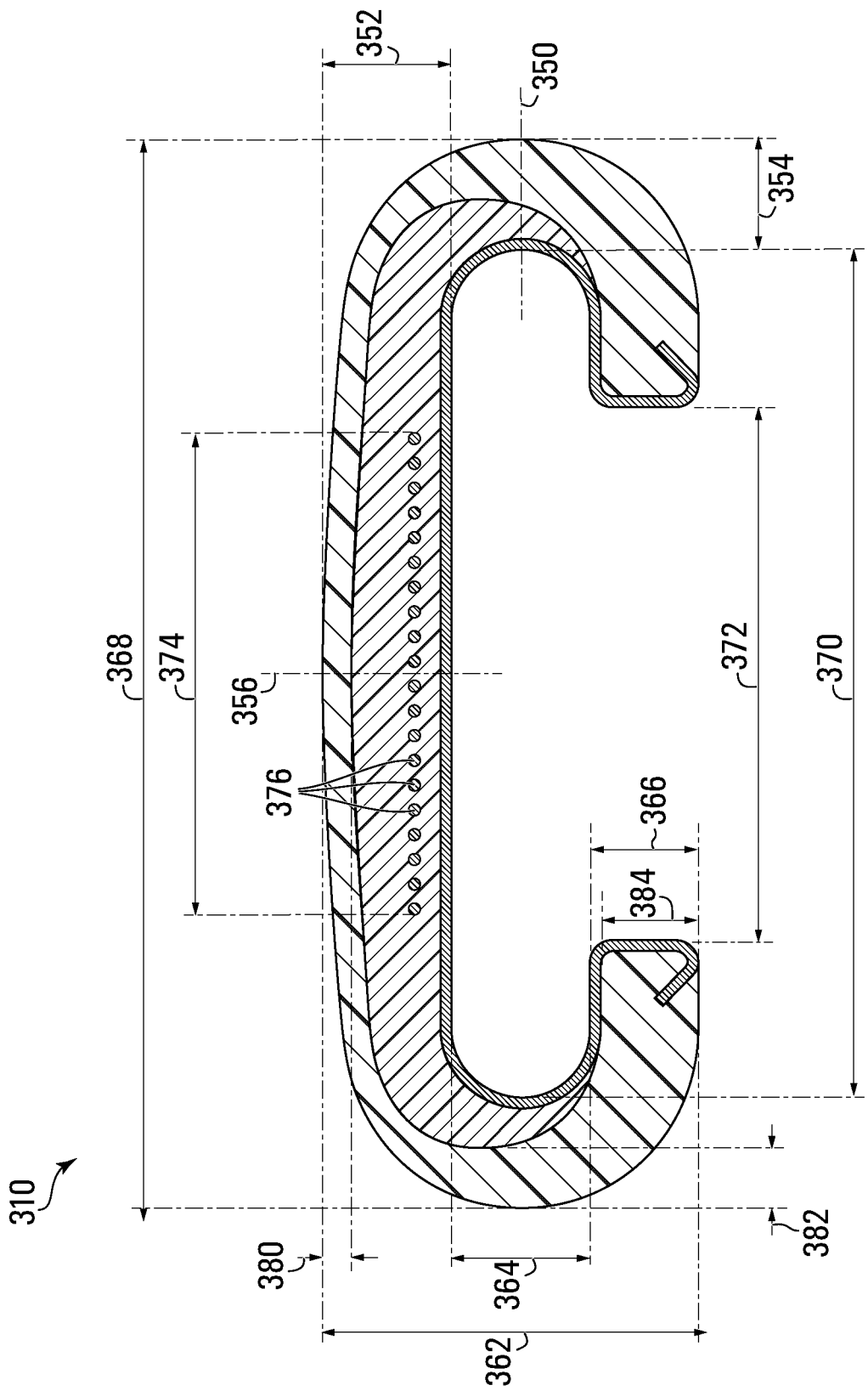

Various dimensions of the handrail 310 are illustrated in FIG. 6. Dimensions for the handrail 310 are provided in Table 4. These dimensions are intended to be illustrative but non-limiting.

TABLE 4

| Dimension | Reference | mm |
| --- | --- | --- |
| face height | 352 | 9.50 |
| slot height | 364 | 10.50 |
| handrail width | 368 | 80.00 |
| slot width | 370 | 63.50 |
| mouth width | 372 | 40.00 |
| cover height | 380 | 2.00 |

In accordance with this example, the cross sectional surface areas of the cover 316 and the carcass 312 can be approximately 500 mm² (52%) and 460 mm² (48%), respectively.

The handrails 110, 210, 310 with foamed carcasses have each been tested and have been shown to function with satisfactory performance, with specific testing described in further detail below. In addition to cost savings, it has also been shown that there can be advantages in the production process when using the foamed versions of these products.

Figure 7:
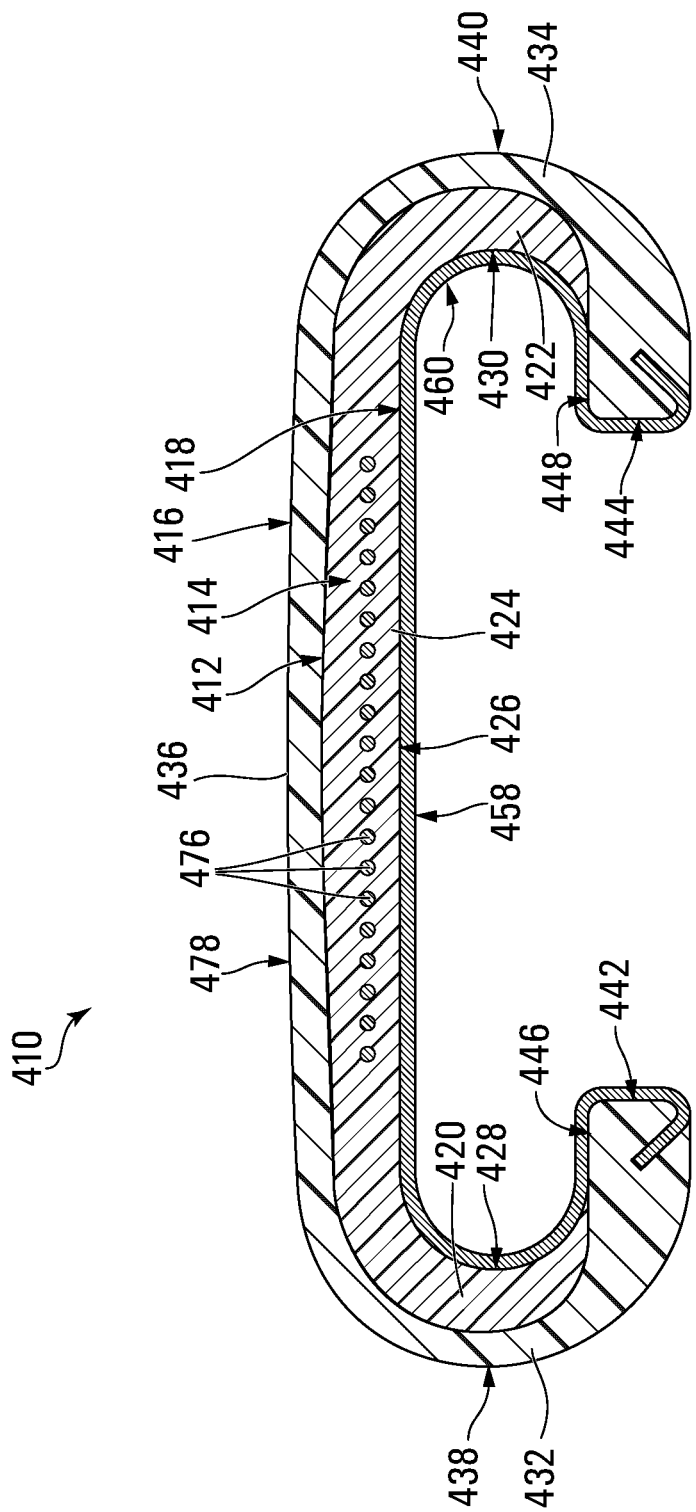
FIGS. 7 and 8 are sectional views of a fourth example of a handrail.

A further handrail type where the foaming agent can be applied is in a compact handrail design, as taught in International Publication No. WO 2016/176778 A1. Referring to FIG. 7, a handrail is shown generally at reference numeral 410. The handrail 410 includes a carcass 412, a stretch inhibitor 414, a cover 416, and a sliding layer 418. The structure of the handrail 410 is similar to that taught in International Publication No. WO 2016/176778 A1, and the description of features will not be repeated.

Figure 8:
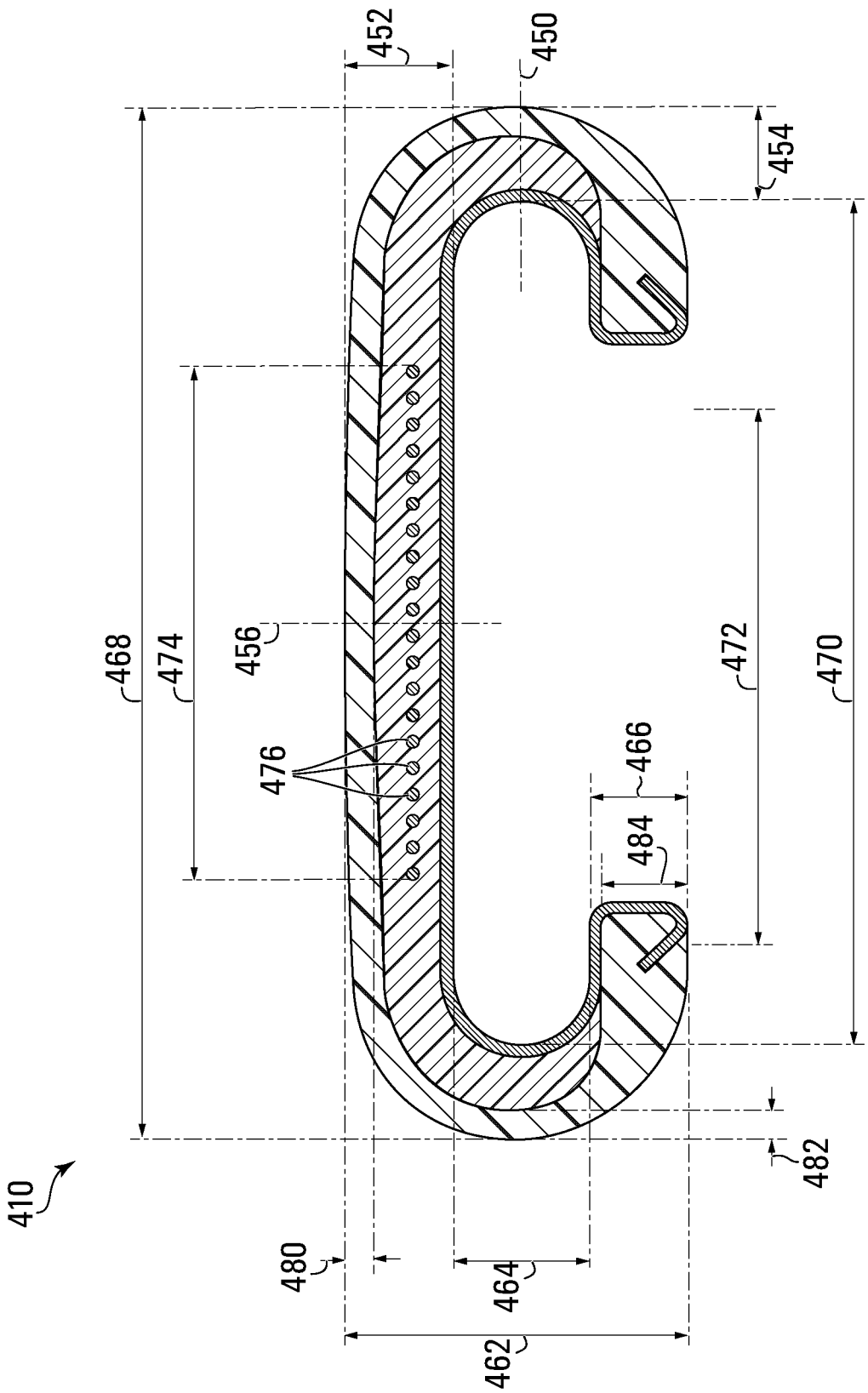

Various dimensions of the handrail 410 are illustrated in FIG. 8. Dimensions for the handrail 410 are provided in Table 5. These dimensions are intended to be illustrative but non-limiting.

TABLE 5

| Dimension | Reference | mm |
| --- | --- | --- |
| face height | 452 | 7.50 |
| slot height | 464 | 9.50 |
| handrail width | 468 | 72.00 |
| slot width | 470 | 59.00 |
| mouth width | 472 | 39.00 |
| cover height | 480 | 2.00 |

In accordance with this example, the cross sectional surface areas of the cover 416 and the carcass 412 can be approximately 310 mm² (47%) and 350 mm² (53%), respectively.

The compact construction of the handrail 410 may reduce the power required to drive the handrail 410. For example, the handrail 410 may be approximately 30 to 40% less weight than a traditional handrail product that it is intended to replace. This reduction in weight will translate to lower power consumption on escalators, moving walkways and/or other transportation apparatus.

Similar reduction in TPU requirement can be achieved with implementing foamed materials in this compact handrail design. However, the smaller cross section of the handrail means that modification may be necessary in order to maintain satisfactory product performance. Material selection is one option, but this product may already use a TPU with a hardness of 95 Shore A TPU for the carcass. Harder versions of TPU can be difficult to use in the extrusion process and there was a desire to maximize the use of the foaming agent for the greatest possible reduction in density and price. This resulted in the development of new handrail structures, which are shown in FIGS. 9, 10, 11 and 12.

Figure 9:
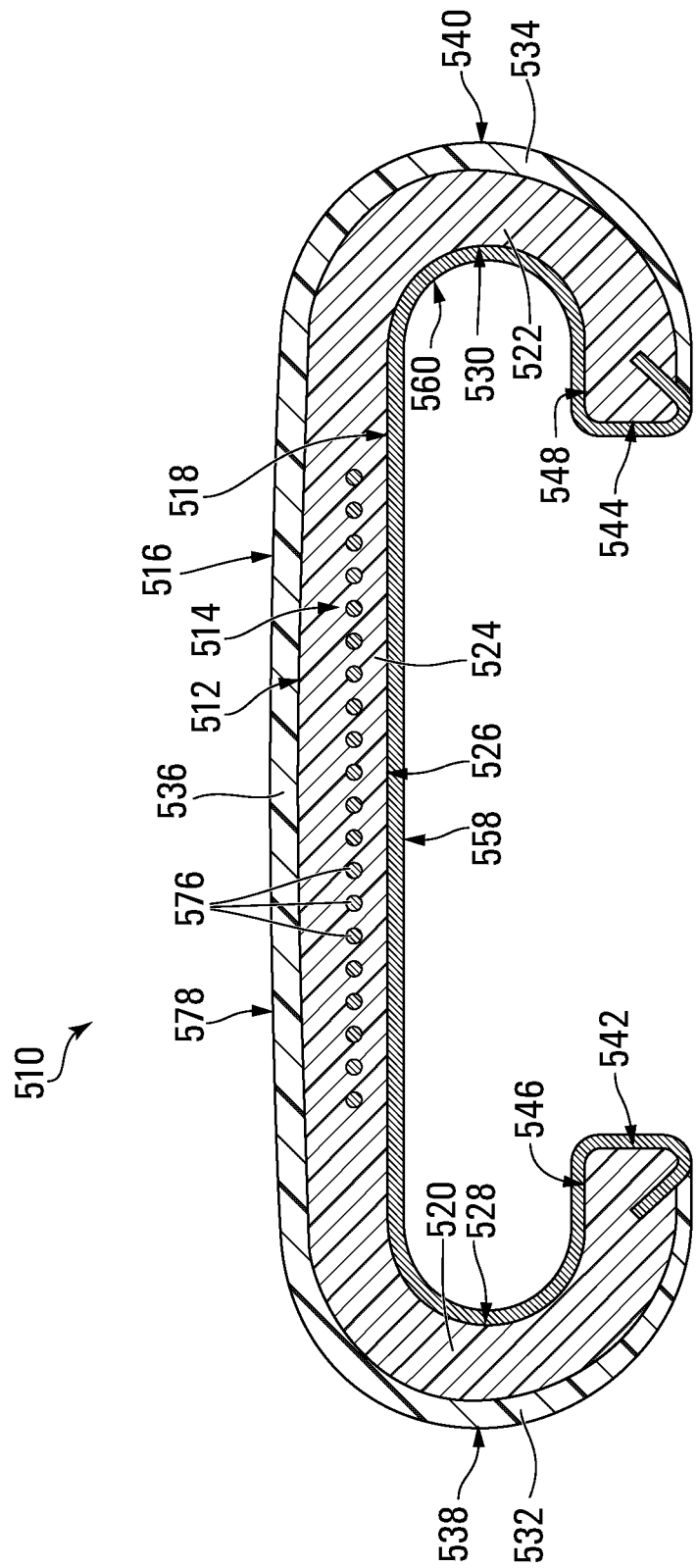
FIGS. 9 and 10 are sectional views of a fifth example of a handrail.

Referring to FIG. 9, a handrail is shown generally at reference numeral 510. The handrail 510 includes a carcass 512, a stretch inhibitor 514, a cover 516, and a sliding layer 518.

In the example illustrated, the carcass 512 includes a first side carcass portion 520, a second side carcass portion 522 spaced apart from the first side carcass portion 520, and a central carcass portion 524 of generally uniform thickness extending between the first and second side carcass portions 520, 522. The stretch inhibitor 514 is shown arranged within the central carcass portion 524. In the example illustrated, the stretch inhibitor 514 is shown formed of a plurality of longitudinal cables 576 disposed along a central plane within the central carcass portion 524. The central carcass portion 524 delineates an upper interior surface 526. The first and second side carcass portions 520, 522 delineate first and second concave interior surfaces 528, 530, respectively. The first and second concave interior surfaces 528, 530 adjoin the upper interior surface 526 on either side thereof.

In the example illustrated, the cover 516 is bonded directly to the carcass 512 at an interface to form a continuous body. The cover 516 includes a first side cover portion 532 covering the first side carcass portion 520, a second side cover portion 534 covering the second side carcass portion 522, and a central cover portion 536 of generally uniform thickness extending between the first and second side cover portions 532, 534, adjacent to the central carcass portion 524. The central cover portion 536 delineates an upper exterior surface 578. The upper exterior surface 578 may exhibit a minor convex curve, as illustrated.

In the example illustrated, the first and second side cover portions 532, 534 delineate first and second convex exterior surfaces 538, 540, respectively. The first and second convex exterior surfaces 538, 540 adjoin the upper exterior surface 578 on either side thereof.

In the example illustrated, with the C-shaped cross section, the first and second side carcass portions 520, 522 extend around the T-shaped slot and define semi-circular lip portions, which delineate generally opposed first and second side interior surfaces 542, 544, respectively.

The first and second side cover portions 532, 534 are shown tapering slightly in thickness around the first and second side carcass portions 520, 522. The first and second side carcass portions 520, 522 may each have slightly increasing thickness towards the first and second side interior surfaces 542, 544, respectively, which compensates for the tapering of the cover 516.

In the example illustrated, the first and second side carcass portions 520, 522 yet further delineate first and second lower interior surfaces 546, 548. The first lower interior surface 546 is shown adjoined between the first concave interior surface 528 and the first side interior surface 542, and the second lower interior surface 548 is shown adjoined between the second concave interior surface 530 and the second side interior surface 544, respectively.

In the example illustrated, the sliding layer 518 is bonded or otherwise secured to the upper interior surface 526, the first and second concave interior surfaces 528, 530, the first and second lower interior surfaces 546, 548, and the first and second side interior surfaces 542, 544. The sliding layer 518 may include curved ends that are embedded within the carcass 512 adjacent to the first and second side interior surfaces 542, 544, as illustrated.

Figure 10:
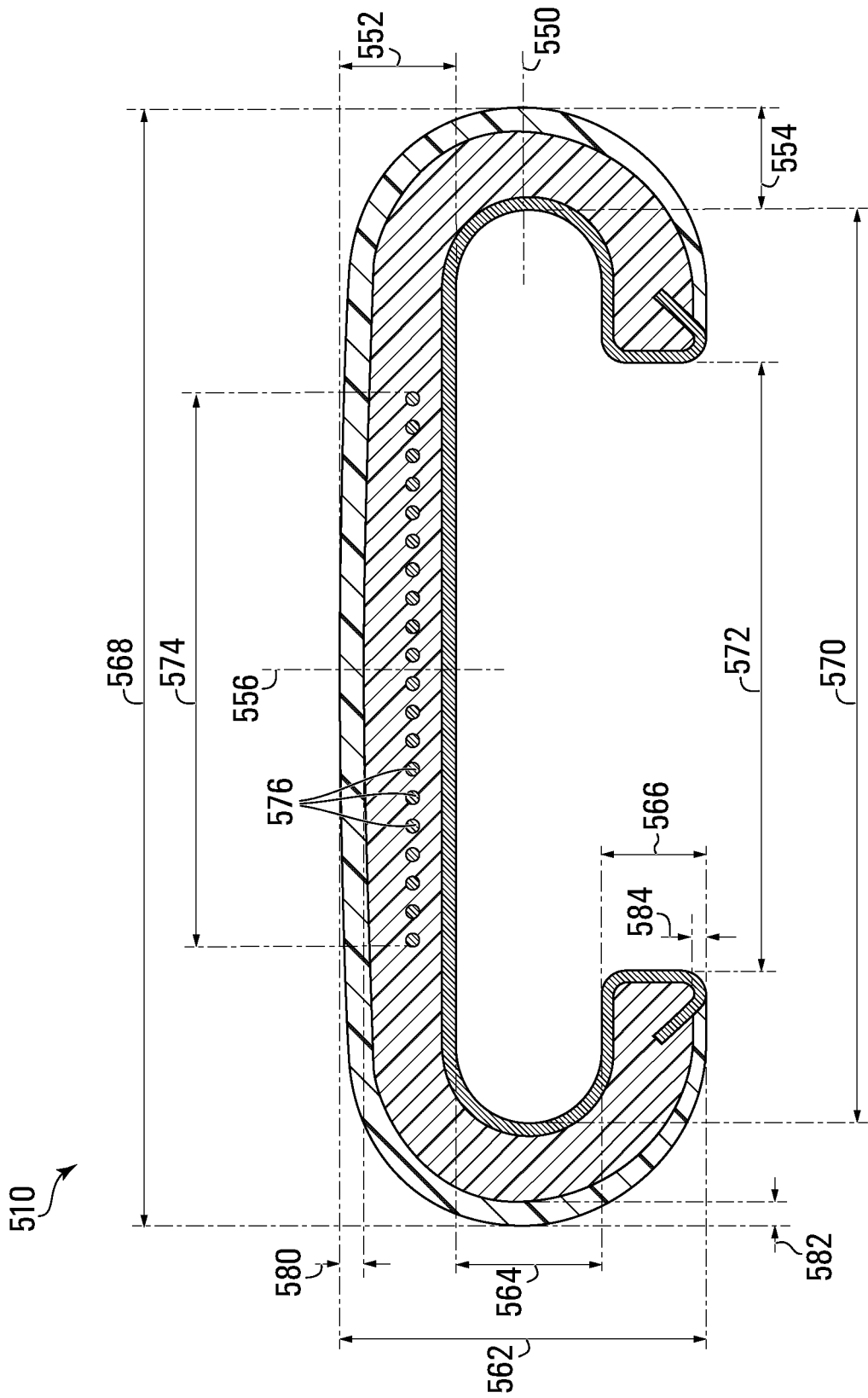

Various dimensions of the handrail 510 are illustrated in FIG. 10. In the example illustrated, the handrail 510 has a face height 552 and a side width 554. The face height 552 is a vertical dimension at a central width axis 556 of the handrail 510 between a bottom surface 558 of the sliding layer 518 and the upper exterior surface 578 (the surfaces 558, 578 are shown in FIG. 1). The side width 554 is a horizontal dimension at a central height axis 550 of the handrail 510 between an inner side surface 560 of the sliding layer 518 and the second convex exterior surface 540 (the surfaces 560, 540 are shown in FIG. 1). The handrail 510 may be generally symmetrical about the central width axis 556, as illustrated, and therefore the side width may be the same on either side of the handrail 510.

Vertical dimensions of the handrail 510 further include a handrail height 562, a slot height 564, a lip height 566, a cover height 580 and a cover lip height 584. Horizontal dimensions of the handrail 510 further include a handrail width 568, a slot width 570, a mouth width 572, a stretch inhibitor width 574, and a cover side width 582.

In the handrail 510, the cross sectional area of the cover 516 is reduced. In some examples, the cover height 580 may be between about 0.5 and about 1.5 mm, the cover side width 582 can be between about 0.5 and about 1.5 mm, and the cover lip height 584 can be between about 0.1 mm and about 1.0 mm.

Various dimensions of the handrail 510 are illustrated in FIG. 10. Dimensions for the handrail 510 are provided in Table 6. These dimensions are intended to be illustrative but non-limiting.

TABLE 6

| Dimension | Reference | mm |
| --- | --- | --- |
| face height | 552 | 7.5 |
| slot height | 564 | 9.5 |
| handrail width | 568 | 72 |
| slot width | 570 | 59 |
| mouth width | 572 | 39 |
| cover height | 580 | 1.5 |
| Cover side width | 582 | 1.5 |
| cover lip height | 584 | 1.0 |

In accordance with this example, the cross sectional surface areas of the cover 516 and the carcass 512 can be approximately 172 mm$^2$ (26%) and 488 mm$^2$ (74%), respectively. The relationship between cross sectional areas of the carcass and cover components can vary. In various examples, the cover can represent between 10 and 30% of the overall TPU required for the handrail.

In the handrail 510, the cover 516 can be thin, in some examples about 1.5 mm or less, so that a greater proportion of the handrail 510 can be foamed for a greater overall reduction in TPU density. In some examples, the carcass 512 can be formed from a TPU with a Shore A hardness of 90 to 98, e.g., Texin 1215™ with a hardness of 95 Shore A. The modulus of the material, and hence the stiffness of the product, can be reduced by the addition of the foaming agent. In some examples, the foaming agent can be added to affect a density reduction of 15 to 30%. The cover 516 can be formed of the same TPU as used for the carcass, but without the foaming agent.

In such examples, where the cover 516 has a higher tensile modulus than the carcass 512, the lip strength, or the ability of the profile to resist opening, will be provided by the cover 516 to a larger degree than in the handrails disclosed in International Publication Nos. WO 2009/033272 A1 and WO 2016/176778 A1, without the foaming agent. Because of this, as illustrated, the first and second side cover portions 532, 534 are shown tapering slightly in thickness around the first and second side carcass portions 520, 522, towards the contact area with the sliding layer 518. This arrangement can prevent the handrail 510 from being too stiff in bending.

Alternatively, at density reduction levels of up to approximately 20%, a cover material with lower modulus than that of the base material of the carcass can be used. In one example, Texin 1215™ with a hardness of 95 Shore A was used as the base material of the carcass 512, and Desmopan 385 E™ (Covestro) with a hardness of 86 Shore A was used as the material for the cover 516. The density of the carcass 512 was reduced by about 15% by using foamed TPU, and the resulting product demonstrated acceptable lip strength and bending characteristics.

Figure 11:
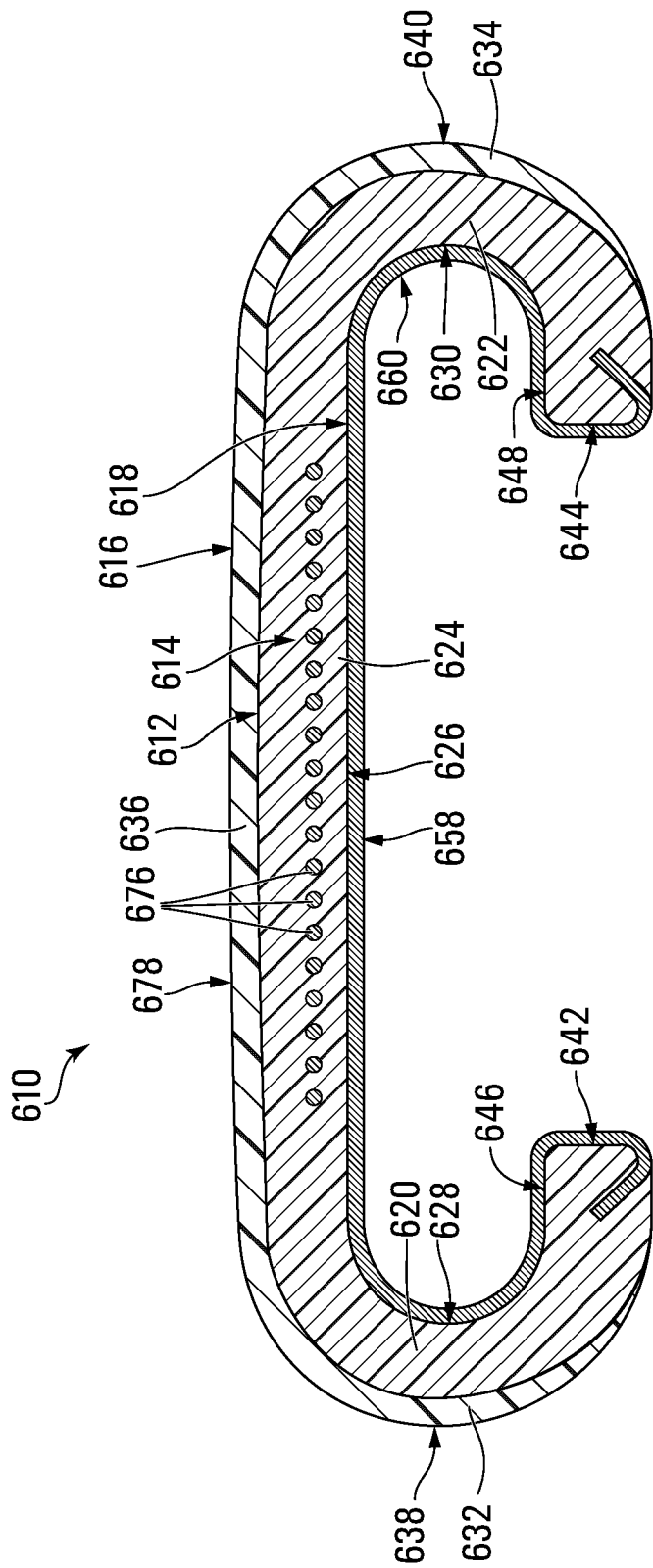
FIGS. 11 and 12 are sectional views of a sixth example of a handrail.
Figure 12:
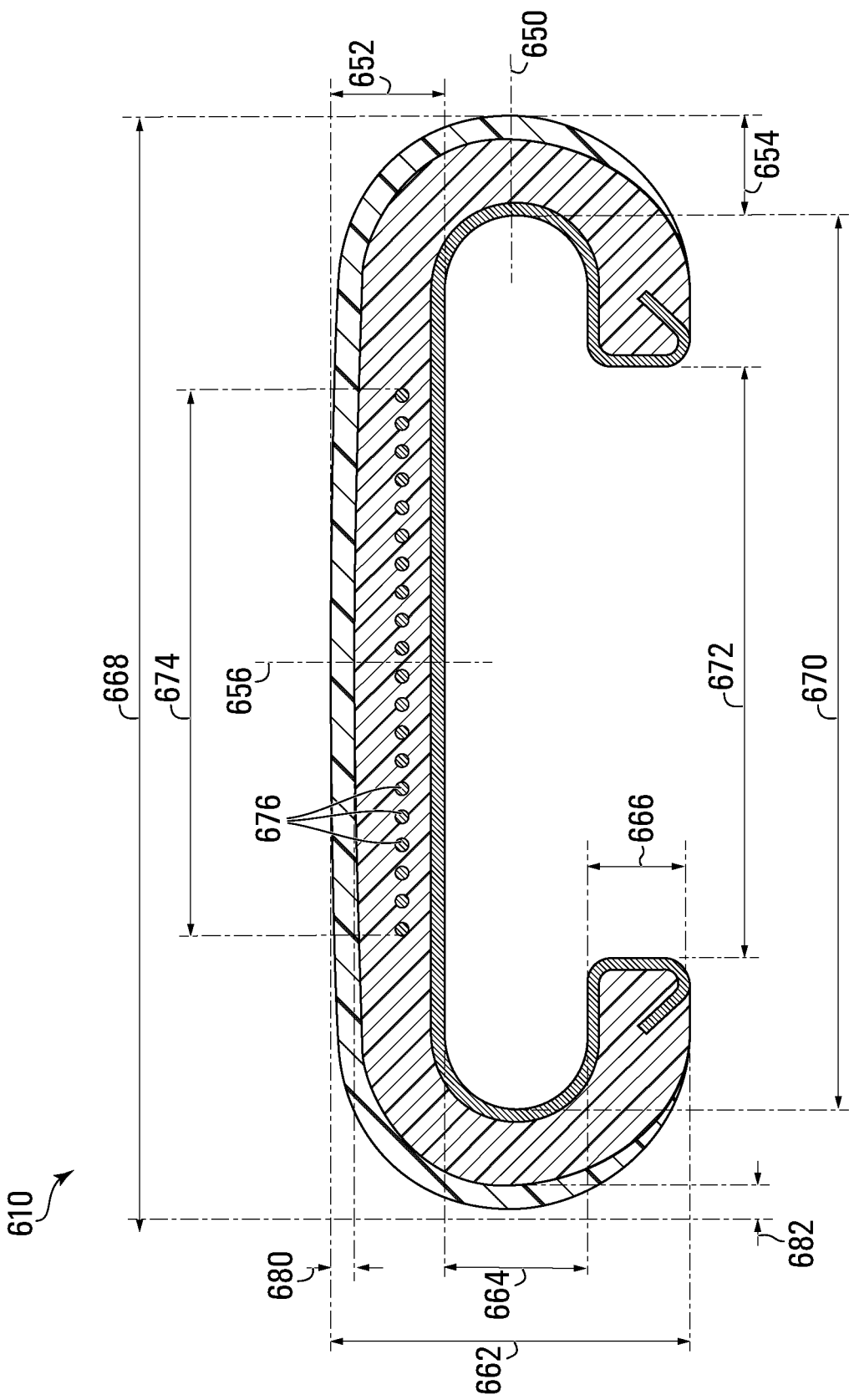

Referring to FIG. 11, a similar handrail is shown generally at reference numeral 610. The handrail 610 includes a carcass 612, a stretch inhibitor 614, a cover 616, and a sliding layer 618. First and second side cover portions 632, 634 are shown tapering in thickness around first and second side carcass portions 620, 622. Compared to the handrail 610, the first and second side cover portions 632, 634 taper more sharply, and terminate along the first and second side carcass portions 620, 622, respectively. The first and second side cover portions 632, 634 each terminate at a position that is offset outwardly in relation to first and second side interior surfaces 642, 644, respectively.

In accordance with this example, the cross sectional surface areas of the cover 616 and the carcass 612 can be approximately 150 mm$^2$ (23%) and 510 mm$^2$ (77%), respectively. Otherwise, the structure of the handrail 610 is similar to that of the handrail 510 shown in FIGS. 10 and 11, and the description of features will not be repeated.

In the handrail 610, lip strength and bending characteristics of the product can be optimized by the properties of the components and their configuration. In the example illustrated, to maximize lip stiffness and bending properties, the first and second side cover portions 632, 634 are completely tapered off in the lip area.

The production of handrails with foamed materials will now be described in further detail.

Figure 13:
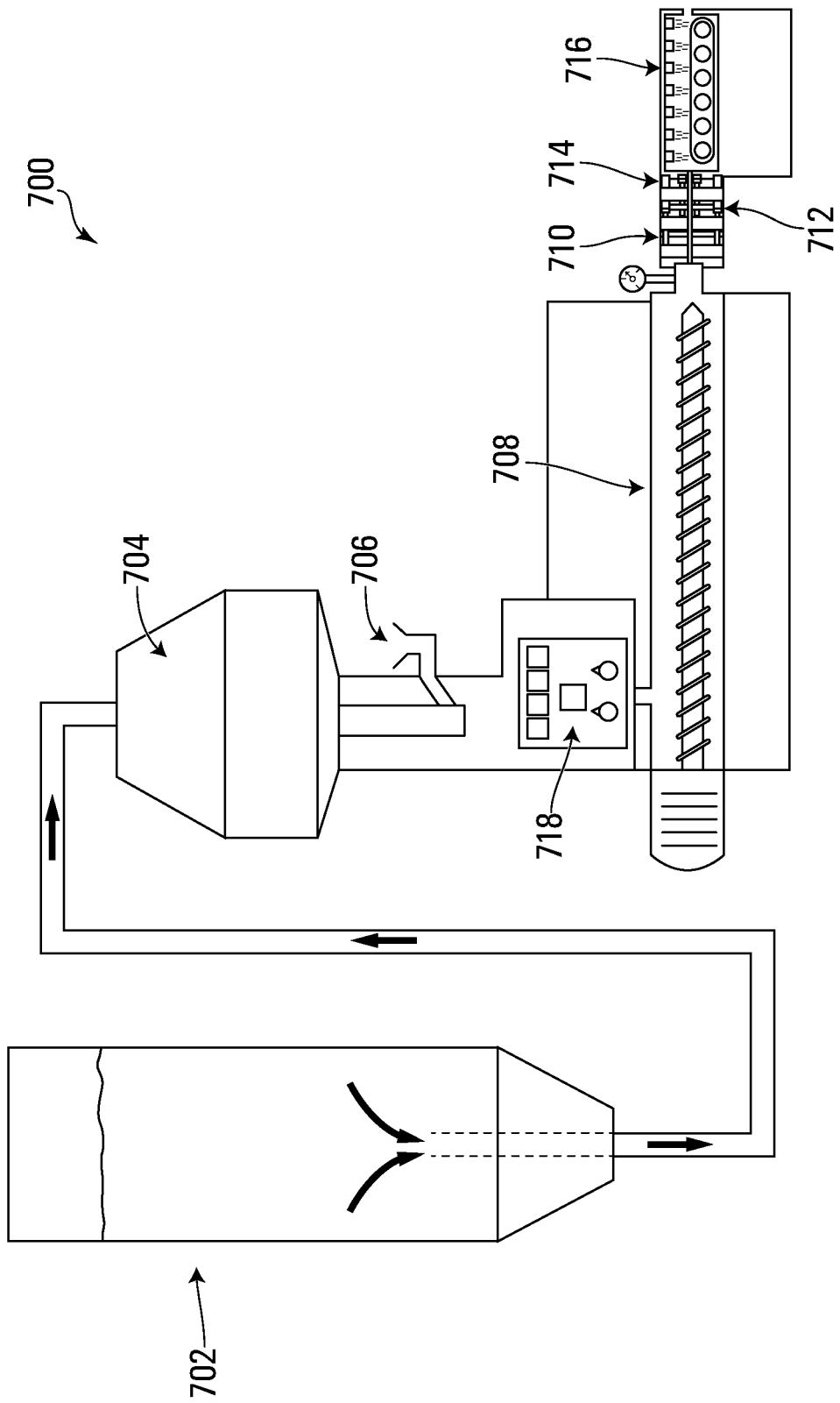
FIG. 13 is a schematic diagram of an example of an extrusion handrail.

Referring to FIG. 13, an example of an extrusion apparatus is shown generally at reference numeral 700. The apparatus 700 was used by the inventors to conduct experimental production of foamed TPU. The apparatus 700 is shown to include a primary hopper 702 for storage of dried TPU for the carcass, a vacuum chamber 704 coupled to the primary hopper 702 for drawing the TPU for the extrusion process, and a side feeder 706 for introducing the blowing agent to the TPU. Molten TPU, including the blowing agent, is then fed to a screw extruder 708, which forces the TPU through a series of dies 710, 712, 714. A cooling system 716 may be provided, and the apparatus 700 may be controlled by an operator via a control panel 718.

TPU for the foam matrix was powderized Texin 1215™ TPU, having a hardness of 95 Shore A, a specific gravity of 1.16, and a $T_m$ of 181° C. (Covestro). The foaming agent was Expancel™ 950 MB 80 with unexpanded microspheres (Akzo Nobel N.V.), having a specific gravity of 0.4-0.5 kg/L, particle size ranging from approximately 20 to 40 µm. From thermomechanical analysis, the Expancel™ microspheres may reach a maximum volume at approximately 210° C.

The TPU pellets were dried in the vacuum chamber 704 at a pressure less than 20 inHg for more than 4 hours. The screw extruder 708 (e.g., a Harrel Geartruder™ extruder) was positioned with three identical ones of the dies 710, 712, 714 attached thereto. During extrusion, a single-phase system is first formed with the matrix and filler in the vicinity of the side feeder 706. At this position, foaming of the TPU is initiated. Downstream, pressure within the screw extruder 708 is maintained at a relatively high level. The formation of gas bubbles may affect the shear stress of the mixture. Accordingly, the pressure of the mixture may increase along a die axis as the mixture proceeds towards an entrance of the dies 710, 712, 714.

A barrel temperature of the screw extruder 708 was maintained at approximately 185° C. and the expanded TPU was processed with a screw speed of approximately 5 rpm. Two temperature profiles at the dies 710, 712, 714 were chosen. For a lower temperature setting, the die 710 was maintained at approximately 165° C., the die 712 was maintained at approximately 150° C., and the die 714 was maintained at approximately 140° C. For an elevated temperature setting, the die 710 was maintained at approximately 180° C., the die 712 was maintained at approximately 170° C., and the die 714 was maintained at approximately 160° C. The Expancel™ microspheres were supplied from the side feeder 706, and a weight percentage of the Expancel™ microspheres in the mixture with the TPU was achieved by coordinating supply of materials from the side feeder 706 and the primary hopper 702. Foam test strips having diameters ranging from about 5 to 7 mm were manufactured and cooled by water at ambient temperature at the cooling system 716.

Figure 14:
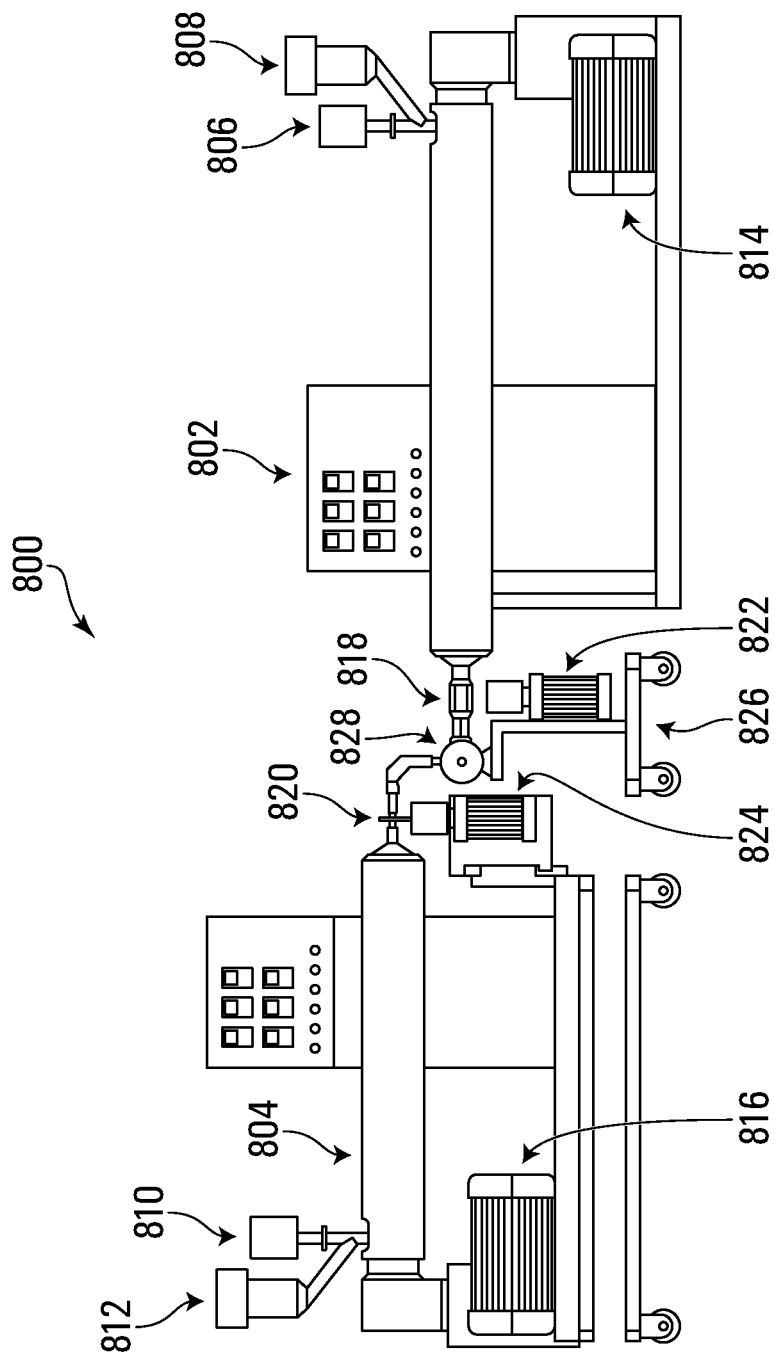
FIG. 14 is a schematic diagram of an example of an extrusion apparatus including two extruders.

Referring to FIG. 14, an example of an extrusion apparatus is shown at reference numeral 800. The apparatus 800 includes a first extruder for the carcass shown at reference numeral 802, and a second extruder for the cover shown at reference numeral 804. Each of the extruders is similar to the apparatus 700 described above and shown in FIG. 13. The extruder 802 includes an inlet 806 for carcass TPU and a side feeder 808 for the introduction of blowing agent to the carcass TPU. The extruder 804 includes an inlet 810 for cover TPU and a side feeder 812, which may be used to introduce color concentrate to the cover TPU. Each of the extruders 802, 804 are shown to include extruder drives 814, 816, respectively for driving the respective positive displacement pumps. Melt pumps 818, 820 and melt pump drives 822, 824 are also shown, which are coupled to a melt pump and die cart 826. The TPU for the carcass and cover are fed by the extruders 802, 804 to a die assembly 828 to manufacture the handrail, e.g., in accordance with the teachings of International Publication No. WO 2009/033270 A1.

Figure 15:
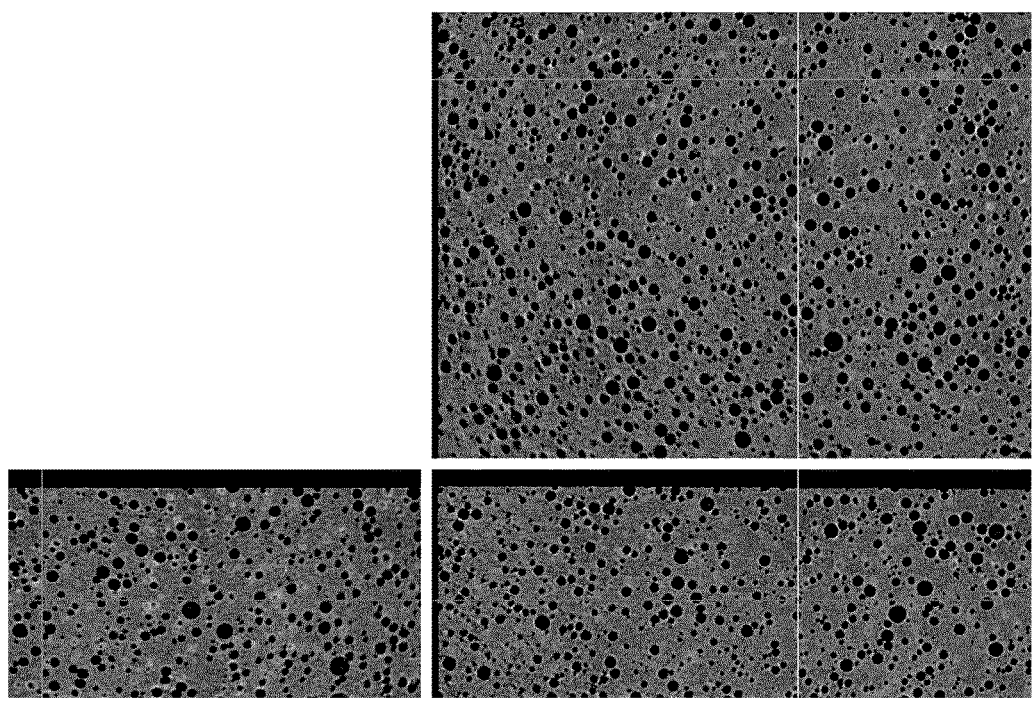
FIG. 15 shows images of a foamed material.

The internal structure of a foamed polymer mainly determines its properties, including physical, mechanical, thermal and/or acoustic properties. Therefore, analyzing the morphology of foamed polymers using computed tomography (CT) may be superior to two dimensional imaging techniques as it provides more comprehensive information. The morphology of foamed TPU samples including Expancel™ microspheres formed under various processing conditions were studied using CT scanning (SkyScan 1172™, Bruker Corp. Belgium). FIG. 15 shows the images of extrusion foamed TPU with approximately 1 wt % Expancel™ microspheres. The images show the foamed TPU having a closed-cell structure and cell distribution that is approximately uniform.

Figure 16:
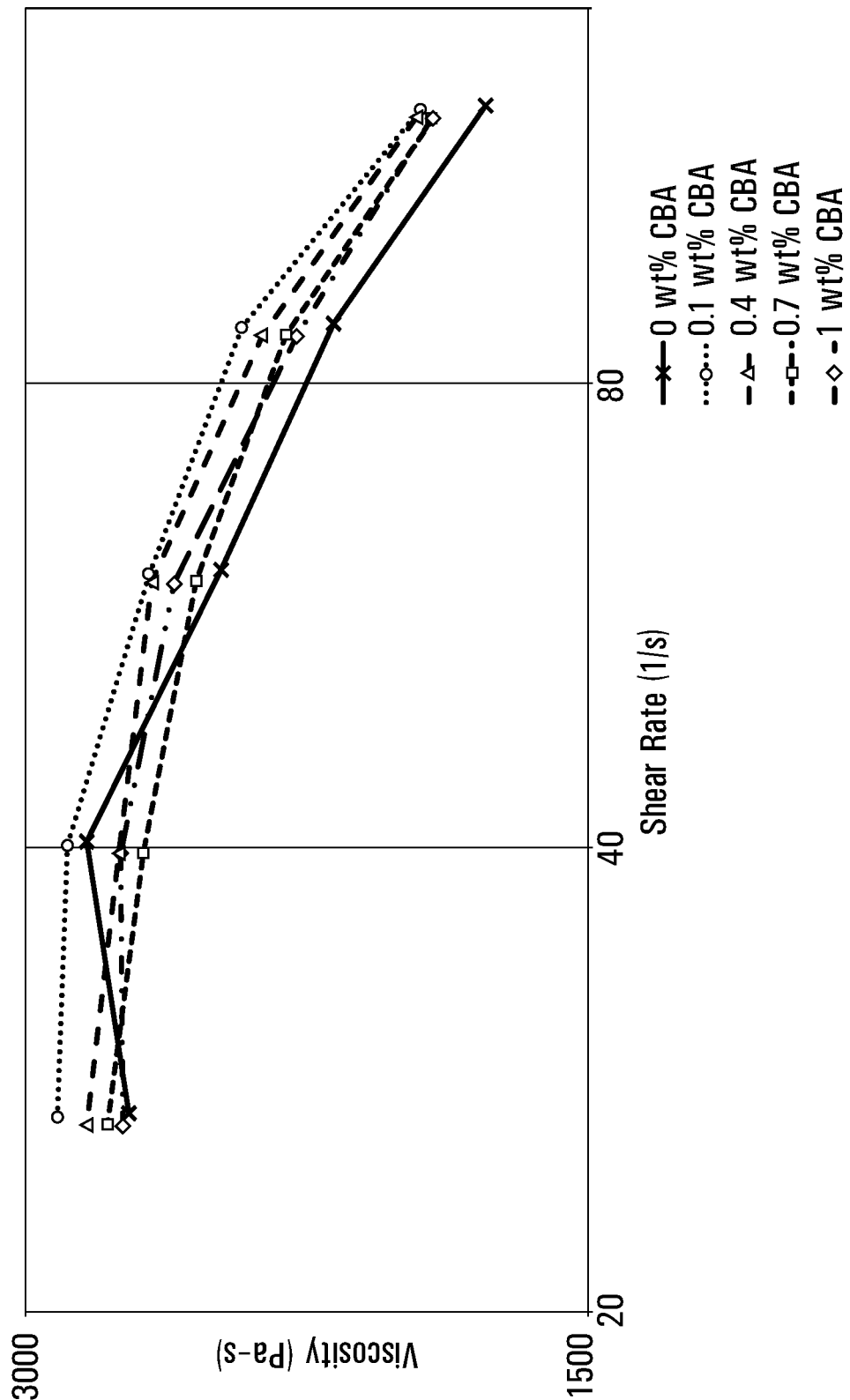
FIG. 16 shows viscosity at 180° C. for materials made with varying levels of a foaming agent.

From a processing point of view, an understanding of polymer melt viscosity during the foaming process may be important because viscosity may determine whether processing parameters need to be changed as compared with an existing TPU extrusion process. A continuous-flow capillary was employed in-situ on an extrusion line to measure the viscosity of TPU melts with various content of Expancel™ microspheres. The results are shown in FIG. 16. By adding 0.1 wt %, 0.4 wt %, 0.7 wt %, and 1 wt % Expancel™ microspheres (by weight) to TPU, the viscosity at 180° C. did not show significant change. This suggests that the processing parameters for TPU foaming process may not need to be changed from an existing TPU extrusion process, including, for example, the extrusion methods and apparatuses taught in International Publication Nos. WO 2009/033270 A1, WO 2009/033272 A1, WO 2009/033273 A1 and/or WO 2016/201578 A1. However, due to the reduced density of the carcass with foamed materials, there may be minor modifications necessary to an existing TPU extrusion process ensure an appropriate delivery of material to a die assembly. This includes, for example, a reduction in gear speed for a positive displacement pump responsible for supplying the carcass TPU upstream of the die assembly (i.e. the screw extruder 708 shown in FIG. 13), the reduction corresponding to the resulting reduction in the density of the foamed carcass.

Besides the production process of the foamed handrails, handrail splicing may also be an important consideration because a splice joint may be the weakest part of a given handrail system. In general, there are two kinds of handrail splicing, namely field (at the handrail assembly site) and factory splicing, and these may involve different techniques and structures. Both types of splice joints were prepared using handrails with a foamed carcass. Further details concerning the splicing of handrails may be seen with reference to U.S. Pat. No. 6,086,806, U.S. Application Nos. 62/591, 954 and/or 62/591,971, and the entire contents of each are herein incorporated by reference. It was found that the use of a foamed carcass material can result in an easier splicing procedure because of a reduction in spew, requiring less precision to fill the splice mold due to expansion of the foamed material.

Handrails having a carcass of foamed material were evaluated as follows to ensure that they meet mechanical property tests:

1. Indoor and Outdoor Handrail Dynamic (Fatigue) Life Test

The handrails with a foamed carcass and a field splice joint passed 1,400 hours of outdoor life testing and with factory splice joint 800 hours of indoor life testing. This test corresponds to a handrail life of approximately 5 years running in the field.

2. Tensile Modulus

Tensile strength tests were performed on handrail carcass to determine the elongation and tensile stress of foamed carcass TPU. The tested samples were prepared by peeling fabric off the underside of handrail, perform rail cut on a peel cutting machine, and cut to a dumbbell's shape (using a die). Comparisons of elongation and tensile stress of carcass TPU materials are shown in Table 7.

TABLE 7

|  | Elongation (%) | Tensile stress (MPa) |
|---|---|---|
| Carcass TPU | 508 | 34.78 |
| Foamed carcass TPU | 465 | 25.23 |

3. Wire Pullout and Fabric Peel Test

Having good adhesion between the cables of the stretch inhibitor and the carcass may be critical to avoid handrail failure. A standard 1" wire pullout test was performed on a foamed handrail before and after 1000 hours of indoor fatigue testing, and a fabric peel test was also performed. The results of 1" wire pullout and fabric peel tests are shown in Table 8.

TABLE 8

|  | Test result | | Minimum requirement |
|---|---|---|---|
| 1" wire pullout (N) | Before fatigue test | 1621.8 | 1200 |
|  | After fatigue test | 1369.7 |  |
| Fabric peel (lbf) |  | 36.6 | 28 |

4. Height and Position of Stretch Inhibitor

In some examples, the cables of the stretch inhibitor may bear up to almost 99% of the handrail load. The position of the cables within the carcass may be sensitive to the internal stress of the cables. To determine if the addition of Expancel™ blowing agent into the carcass may affect the height and position of the cables, the height of the cables along a cross section of the handrail was measured. As shown in FIG. 16, an average height the cables was increased by approximately 1.3% by adding Expancel™. This suggests that the addition of Expancel™ blowing agent does not lead to a substantial change in the height, but rather the difference may likely be explained by variability between runs.

Figure 17:
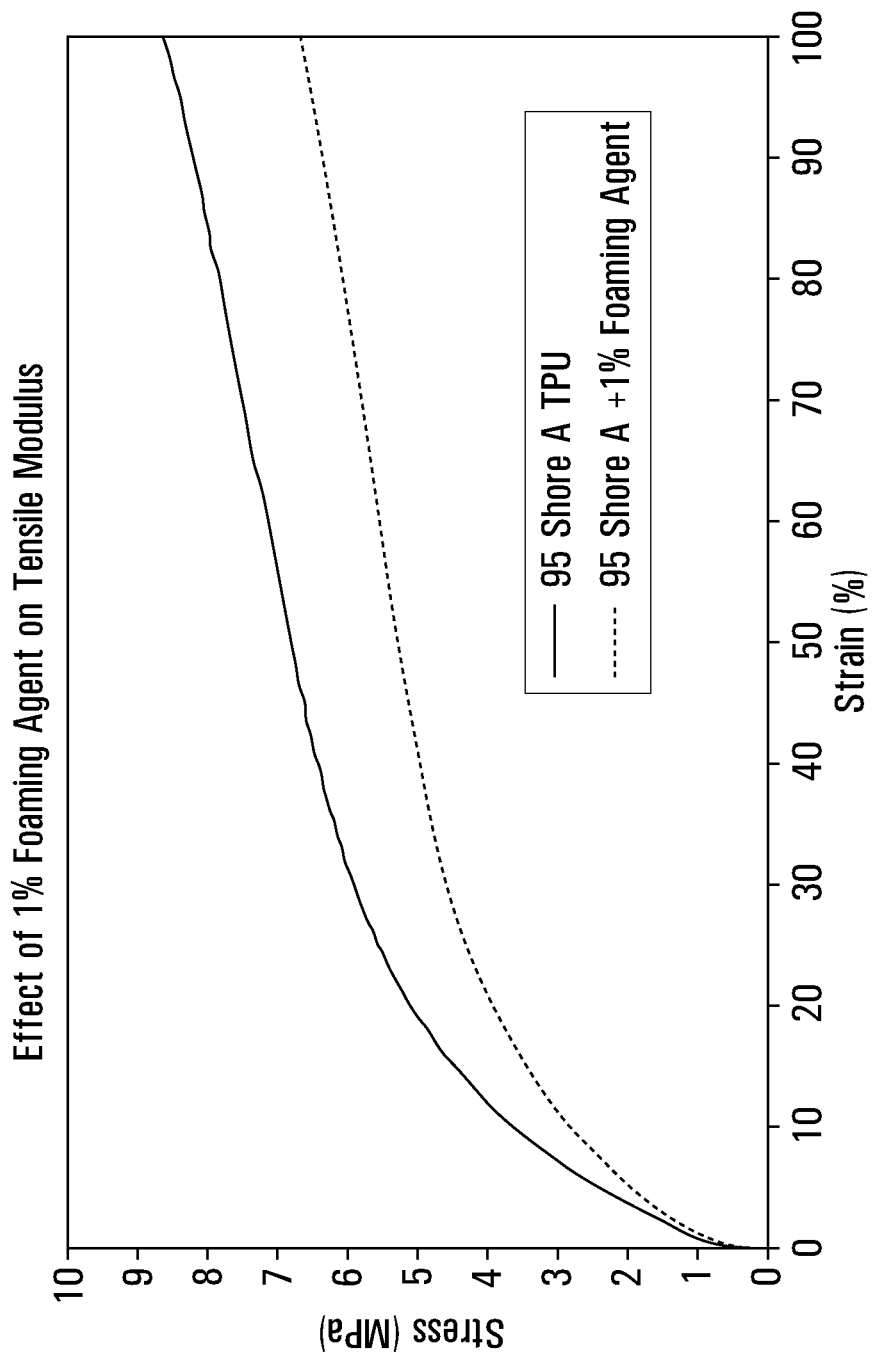
FIG. 17 shows stress versus strain for TPU materials without and with 1 wt % foaming agent.

FIG. 17 shows cables of the stretch inhibitor positioned within the foamed carcass.

Figure 18:
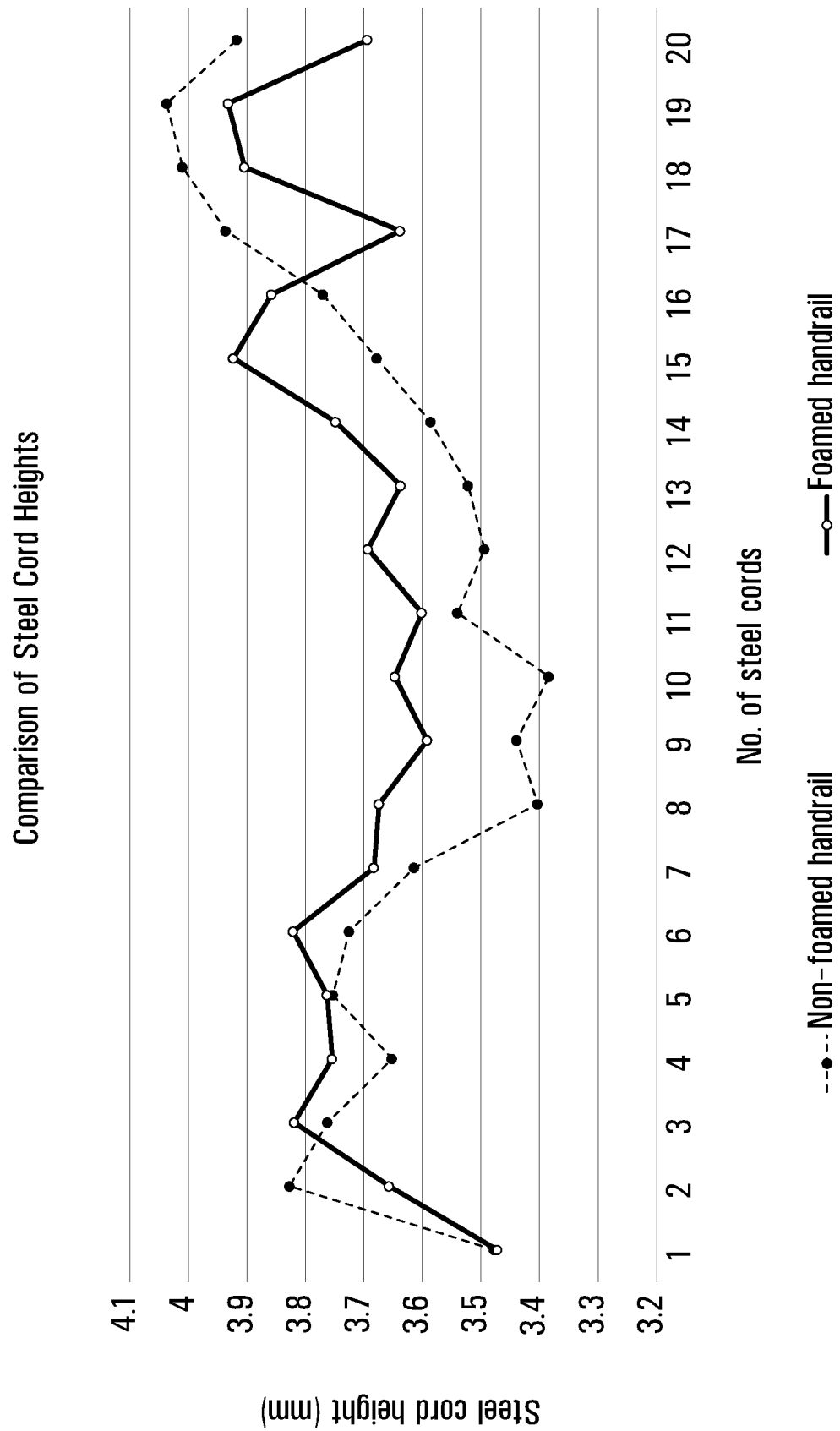
FIG. 18 shows heights of cables of a stretch inhibitor of the handrail within solid and foamed materials.
Figure 19:
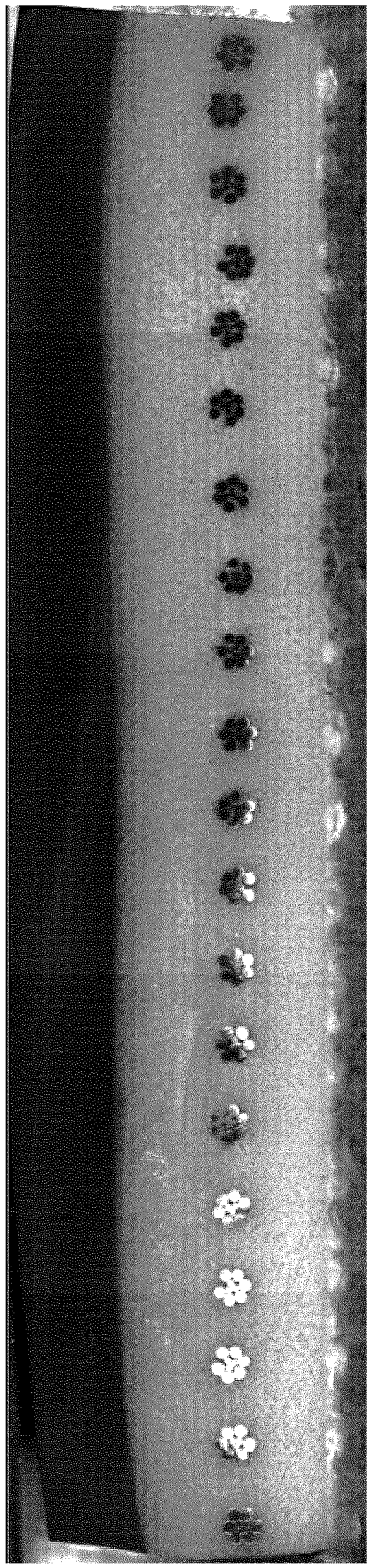
FIG. 19 is an image of cables disposed within a foamed material.
Figure 21:
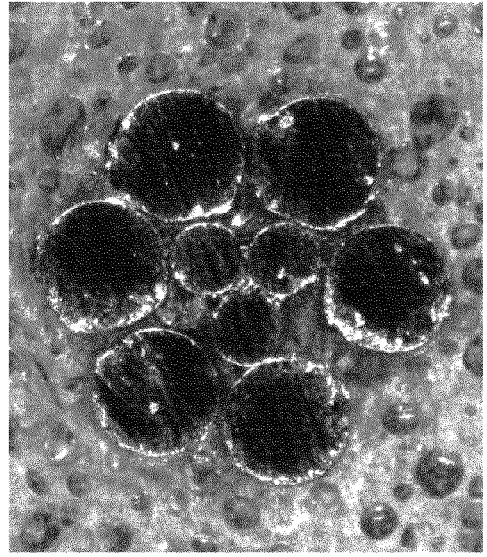
FIGS. 20 and 21 are zoomed images of cables disposed within solid and foamed materials, respectively.
Figure 20:
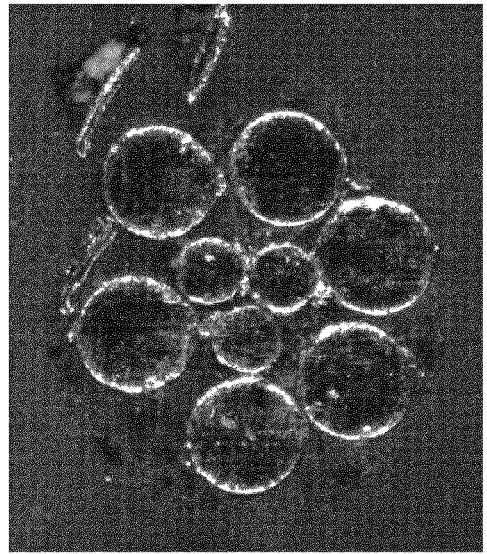

FIGS. 18 and 19 show penetration of solid and foamed carcass material, respectively, around one of the multi-strand cables. It appears that the addition of Expancel™ blowing agent may not affect TPU penetration around the cables. The size of the microspheres appears to be larger than the distance between cables, and therefore they are positioned around the group of cables and not in between.

Referring to Table 9, therein is provided an exemplary cost calculation based on handrails produced with 1 wt % Expancel™ blowing agent. The calculation is intended to be illustrative and non-limiting. Although 14% of the carcass TPU weight was reduced due to the foamed material, the cost of the Expancel™ blowing agent is approximately four times that of the TPU, and therefore an overall savings of only approximately 10% may be realized. If the proportion of the carcass materials in the handrail is increased, then the potential to save additional cost is increased. In addition to reduced material cost, the use of foamed materials in the carcass may also result in an increase in production speed due to a reduction in the density and heat capacity of the foamed carcass. This results in faster cooling and setup during the extrusion process, which can mean lower production costs.

TABLE 9

|  | TPU savings | Material costs (carcass) | Total cost |
|---|---|---|---|
| No Expancel ™ | 0 | 100%TPU | 100% TPU |
| With Expancel ™ | 14% | (100-14)%TPU+1%Expancel(4 times cost of TPU) | 90% TPU |
| Cost saving |  |  | 10% TPU |

In summary, by adding 1 wt % Expancel™ microspheres, 10% of the carcass TPU cost may be saved, and 14% of the carcass TPU weight may be reduced in a handrail.

The subject matter of interest herein is not necessarily limited to handrails, and may apply more broadly to other articles of constant cross section.

Furthermore, although foaming is discussed herein as a particular approach for reducing the density of a handrail carcass, and Expancel™ is named as a particular chemical blowing agent, it may be possible to use other techniques and agents to achieve composite handrails having portions with reduced density and yet acceptable mechanical characteristics. Other chemical blowing agents can be used, such as, for example and not intended to be limiting, Infinergy™ (BASF), or in some cases it may be possible for the foaming to be achieved by mechanically injecting a gas in to an extrusion melt stream.

Moreover, it will be appreciated that terms used herein to convey geometrical or mathematical relationships need not be construed with absolute precision. For example, the terms 'concave' and 'convex' as used herein need not be interpreted to mean structures having a curved surface that is exactly circular. These terms and other terms herein may be interpreted with some flexibility, without strict adherence to mathematical definitions, as will be appreciated by persons skilled in the art. It will also be appreciated that terms used herein to connote orientation, including 'vertical', 'horizontal', 'width' and 'height', correspond to the handrail as illustrated in the drawings and are intended to aid with understanding, but need not refer to the orientation of various components during manufacture and/or use.

While the above description provides examples of one or more apparatuses or methods, it will be appreciated that other apparatuses or methods may be within the scope of the accompanying claims.

We claim:

1. A handrail suitable for use with an escalator, a moving walkway and/or other transportation apparatus, the handrail comprising:
   a carcass;
   a stretch inhibitor within the carcass; and
   a sliding layer bonded to the carcass,
   wherein at least a portion of the carcass comprises a gas phase dispersed in a solid polymer matrix.

2. The handrail of claim 1, wherein the gas phase reduces a density of the at least a portion of the carcass by at least 5% as compared to a density of the polymer matrix.

3. The handrail of claim 2, wherein the gas phase reduces the density of the at least a portion of the carcass by at least 10% as compared to the density of the polymer matrix.

4. The handrail of claim 3, wherein the gas phase reduces the density of the at least a portion of the carcass by about 15% as compared to the density of the polymer matrix.

5. The handrail of claim 1, wherein the carcass has a generally uniform distribution of gas bubbles in the polymer matrix.

6. The handrail of claim 5, wherein the gas bubbles define a generally closed cell structure in the polymer matrix.

7. The handrail of claim 1, wherein the gas phase is formed of particles of a syntactic foam dispersed in the polymer matrix.

8. The handrail of claim 7, wherein the particles comprise Expancel™ expanded microspheres.

9. The handrail of claim 8, wherein the carcass has approximately 1% (by weight) of the Expancel™ expanded microspheres.

10. The handrail of claim 1, wherein the polymer matrix is formed of a first thermoplastic material.

11. The handrail of claim 10, wherein the first thermoplastic material consists of a polyester-based thermoplastic polyurethane.

12. The handrail of claim 11, wherein the first thermoplastic material has a hardness of between about 92 and 98 Shore A.

13. The handrail of claim 12, wherein the first thermoplastic material has a hardness of about 95 Shore A.

14. The handrail of claim 1, wherein:
   the carcass comprises a first side carcass portion, a second side carcass portion spaced apart from the first side carcass portion, and a central carcass portion of generally uniform thickness extending between the first and second side carcass portions, the central carcass portion defining an upper interior surface, and the first and second side carcass portions defining first and second concave interior surfaces, respectively, adjoining the upper interior surface on either side thereof;
   the stretch inhibitor is within the central carcass portion; and
   the sliding layer is bonded at least to the upper interior surface and the first and second concave interior surfaces.

15. The handrail of claim 14, comprising a cover bonded to the carcass, the cover comprising a first side cover portion covering the first side carcass portion, a second side cover portion covering the second side carcass portion, and a central cover portion of generally uniform thickness extending between the first and second side cover portions adjacent to the central carcass portion, the central cover portion defining an upper exterior surface, and the first and second side cover portions defining first and second convex exterior surfaces, respectively, adjoining the upper exterior surface on either side thereof, the first and second side cover portions further defining first and second lower interior surfaces, respectively, adjoined between the first and second concave interior surfaces and generally opposed first and second side interior surfaces, respectively, and wherein the cover is formed of a second thermoplastic material.

16. The handrail of claim 15, wherein the carcass tapers in thickness around the first and second side carcass portions, and the cover has a corresponding increase in thickness around the first and second side cover portions, the first and second side cover portions further defining the first and second side interior surfaces, respectively.

17. The handrail of claim 15, wherein the cover tapers in thickness around the first and second side cover portions, and the carcass has a corresponding increase in thickness around the first and second side carcass portions, the first and second side carcass portions further defining the first and second side interior surfaces, respectively.

18. The handrail of claim 17, wherein a cover lip height at the first and second side interior surfaces is between about 0.1 and about 1.0 mm.

19. The handrail of claim 17, wherein each of the first and second side cover portions terminates at a position that is offset outwardly in relation to the first and second side interior surfaces, respectively.

20. The handrail of claim 17, wherein a cover height at a central width axis is between about 0.5 and about 1.5 mm.

21. The handrail of claim 17, wherein a cover side width at a central height axis is between about 0.5 and about 1.5 mm.

22. The handrail of claim 17, wherein the cover is sized to require between about 10 and about 30% of the thermoplastic material of the handrail.

23. The handrail of claim 15, wherein the second thermoplastic material consists of a polyester-based thermoplastic polyurethane.

24. The handrail of claim 23, wherein the second thermoplastic material has a hardness of between about 85 and 92 Shore A.

25. The handrail of claim 24, wherein the second thermoplastic material has a hardness of about 86 Shore A.

26. A handrail suitable for use with an escalator, a moving walkway and/or other transportation apparatus, the handrail comprising:
   a carcass;
   a cover bonded to the carcass;
   a stretch inhibitor within the carcass; and
   a sliding layer bonded to the carcass,
   wherein at least a portion of the carcass comprises a gas phase dispersed in a first thermoplastic material.

27. A method of manufacturing the handrail of claim 1, wherein the method comprises:
   supplying the stretch inhibitor and the sliding layer to a die assembly;
   supplying the first thermoplastic material to the die assembly in a molten state;
   dispersing the gas phase in the first thermoplastic material to form the carcass;
   bringing the first thermoplastic material together with the stretch inhibitor, thereby to embed the stretch inhibitor within the first thermoplastic material;
   bringing the sliding layer up against the first thermoplastic material, the first thermoplastic material, the stretch inhibitor and the sliding layer thereby forming a composite extrudate; and
   extruding the composite extrudate from the die assembly.

28. A handrail, comprising:
a carcass;
a stretch inhibitor within the carcass; and
a sliding layer bonded to the carcass,
wherein at least a portion of the carcass comprises a gas phase dispersed in a solid polymer matrix,
wherein:
the carcass comprises a first side carcass portion, a second side carcass portion spaced apart from the first side carcass portion, and a central carcass portion of generally uniform thickness extending between the first and second side carcass portions, the central carcass portion defining an upper interior surface, and the first and second side carcass portions defining first and second concave interior surfaces, respectively, adjoining the upper interior surface on either side thereof;
the stretch inhibitor is within the central carcass portion; and
the sliding layer is bonded at least to the upper interior surface and the first and second concave interior surfaces, and comprising a cover bonded to the carcass, the cover comprising a first side cover portion covering the first side carcass portion, a second side cover portion covering the second side carcass portion, and a central cover portion of generally uniform thickness extending between the first and second side cover portions adjacent to the central carcass portion, the central cover portion defining an upper exterior surface, the first and second side cover portions defining first and second convex exterior surfaces, respectively, adjoining the upper exterior surface on either side thereof, the first and second side cover portions further defining first and second lower interior surfaces, respectively, adjoined between the first and second concave interior surfaces and generally opposed first and second side interior surfaces, respectively, and wherein the cover is formed of a second thermoplastic material.

* * * * *